(12) United States Patent
Wallentin et al.

(10) Patent No.: US 11,412,439 B2
(45) Date of Patent: Aug. 9, 2022

(54) STOP OF BARRING TIMERS

(71) Applicant: Telefonaktiebolaget LM Ericsson (publ), Stockholm (SE)

(72) Inventors: Pontus Wallentin, Linköping (SE); Jens Bergqvist, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 17/252,801

(22) PCT Filed: Jun. 14, 2019

(86) PCT No.: PCT/IB2019/055008
§ 371 (c)(1),
(2) Date: Dec. 16, 2020

(87) PCT Pub. No.: WO2019/243976
PCT Pub. Date: Dec. 26, 2019

(65) Prior Publication Data
US 2021/0266817 A1    Aug. 26, 2021

Related U.S. Application Data

(66) Substitute for application No. 62/688,067, filed on Jun. 21, 2018.

(51) Int. Cl.
*H04W 48/02* (2009.01)
*H04W 36/08* (2009.01)
*H04W 48/16* (2009.01)
*H04W 68/00* (2009.01)

(52) U.S. Cl.
CPC .......... *H04W 48/02* (2013.01); *H04W 36/08* (2013.01); *H04W 48/16* (2013.01); *H04W 68/005* (2013.01)

(58) Field of Classification Search
CPC ..... H04W 48/02; H04W 36/08; H04W 48/16; H04W 68/005; H04W 48/12; H04W 48/08
USPC .............................. 370/329; 455/435.1–444
See application file for complete search history.

(56) References Cited

U.S. PATENT DOCUMENTS

| | | | |
|---|---|---|---|
| 2017/0295536 A1 | 10/2017 | Kim et al. | |
| 2018/0324866 A1* | 11/2018 | Lee | H04W 74/0833 |
| 2019/0357119 A1* | 11/2019 | Hong | H04W 48/08 |
| 2019/0364462 A1* | 11/2019 | Kim | H04W 36/02 |
| 2021/0112597 A1* | 4/2021 | Sharma | H04W 48/02 |

OTHER PUBLICATIONS

3GPP TSG-RAN WG2 #97bis; Spokane, USA; Source: Ericsson; Title: Access Control for NR (Tdoc R2-1702865)—Apr. 3-7, 2017.
3GPP TSG-RAN WG2 #102; Busan, Republic of Korea; Source: Ericsson; Title: Open issues in the unified access control procedure (R2-1806765)—May 21-25, 2018.
(Continued)

*Primary Examiner* — Michael Y Mapa
(74) *Attorney, Agent, or Firm* — Sage Patent Group

(57) ABSTRACT

A method by a wireless device is provided to perform access barring. The method includes starting (1402) a barring timer when an access attempt is barred and, based on a change in barring information (1404), the barring timer is stopped. Alleviation of access barring may be performed when the barring timer is stopped.

26 Claims, 21 Drawing Sheets

(56) References Cited

OTHER PUBLICATIONS

3GPP TSG-RAN WG2 Meeting #102; Busan, Korea; Source: LG Electronics Inc.; Title: The UE operation applying CE level based access barring (R2-1808389 (Revision of R2-1805272))—May 21-25, 2018.

3GPP TSG-RAN WG2 #102; Busan, Republic of Korea; Source: LG Electronics Inc.; Title: Handling of Timers in UAC (R2-1808594 (Resubmission of R2-1805938))—May 21-25, 2018.

PCT International Search Report issued for International application No. PCT/IB2019/055008—dated Oct. 28, 2019.

PCT Written Opinion of the International Searching Authority issued for International application No. PCT/IB2019/055008—dated Oct. 28, 2019.

* cited by examiner

```
BarringPerACDC-Category-r13 ::= SEQUENCE {
    acdc-Category-r13              INTEGER (1..maxACDC-Cat-r13),
    acdc-BarringConfig-r13         SEQUENCE {
        ac-BarringFactor-r13           ENUMERATED {
                                           p00, p05, p10, p15, p20, p25, p30, p40,
                                           p50, p60, p70, p75, p80, p85, p90, p95},
        ac-BarringTime-r13             ENUMERATED {s4, s8, s16, s32, s64, s128,
s256, s512}
    }                              OPTIONAL    -- Need OP
}
```

| Access Identity number | UE configuration |
|---|---|
| 0 | UE is not configured with any parameters from this table |
| 1 (NOTE 1) | UE is configured for Multimedia Priority Service (MPS). |
| 2 (NOTE 2) | UE is configured for Mission Critical Service (MCS). |
| 3-10 | Reserved for future use |
| 11 (NOTE 3) | Access Class 11 is configured in the UE. |
| 12 (NOTE 3) | Access Class 12 is configured in the UE. |
| 13 (NOTE 3) | Access Class 13 is configured in the UE. |
| 14 (NOTE 3) | Access Class 14 is configured in the UE. |
| 15 (NOTE 3) | Access Class 15 is configured in the UE. |

NOTE 1: Access Identity 1 is used by UEs configured for MPS, in the PLMNs where the configuration is valid. The PLMNs where the configuration is valid are HPLMN, PLMNs equivalent to HPLMN, visited PLMNs of the home country, and configured visited PLMNs outside the home country.

NOTE 2: Access Identity 2 is used by UEs configured for MCS, in the PLMNs where the configuration is valid. The PLMNs where the configuration is valid are HPLMN or PLMNs equivalent to HPLMN.

NOTE 3: Access Identities 11 and 15 are valid in Home PLMN only if the EHPLMN list is not present or in any EHPLMN. Access Identities 12, 13 and 14 are valid in Home PLMN and visited PLMNs of home country only. For this purpose the home country is defined as the country of the MCC part of the IMSI.

FIGURE 8

| Access Category number | Conditions related to UE | Type of access attempt |
|---|---|---|
| 0 | All | MO signalling resulting from paging |
| 1 (NOTE 1) | UE is configured for delay tolerant service and subject to access control for Access Category 1, which is judged based on relation of UE's HPLMN and the selected PLMN. | All except for Emergency |
| 2 | All | Emergency |
| 3 | All except for the conditions in Access Category 1. | MO signalling resulting from other than paging |
| 4 | All except for the conditions in Access Category 1. | MMTEL voice (NOTE 3) |
| 5 | All except for the conditions in Access Category 1. | MMTEL video |
| 6 | All except for the conditions in Access Category 1. | SMS |
| 7 | All except for the conditions in Access Category 1. | MO data that do not belong to any other Access Categories (NOTE 4) |
| 8-31 | | Reserved standardized Access Categories |
| 32-63 (NOTE 2) | All | Based on operator classification |

NOTE 1: The barring parameter for Access Category 1 is accompanied with information that define whether Access Category applies to UEs within one of the following categories:
a) UEs that are configured for delay tolerant service;
b) UEs that are configured for delay tolerant service and are neither in their HPLMN nor in a PLMN that is equivalent to it;
c) UEs that are configured for delay tolerant service and are neither in the PLMN listed as most preferred PLMN of the country where the UE is roaming in the operator-defined PLMN selector list on the SIM/USIM, nor in their HPLMN nor in a PLMN that is equivalent to their HPLMN.

NOTE 2: When there are an Access Category based on operator classification and a standardized Access Category to both of which an access attempt can be categorized, and the standardized Access Category is neither 0 nor 2, the UE applies the Access Category based on operator classification. When there are an Access Category based on operator classification and a standardized Access Category to both of which an access attempt can be categorized, and the standardized Access Category is 0 or 2, the UE applies the standardized Access Category.

NOTE 3: Includes Real-Time Text (RTT).
NOTE 4: Includes IMS Messaging.

FIGURE 9

| Rule # | Type of access attempt | Requirements to be met | Access Category |
|---|---|---|---|
| 1 | Response to paging | Access attempt is for MT access | 0 (= MT_acc) |
| 2 | Emergency | UE is attempting access for an emergency session (NOTE 1, NOTE 2) | 2 (= emergency) |
| 3 | Access attempt for operator-defined access category | UE was provided with operator-defined access categories for the current PLMN, and access attempt is matching criteria of an operator-defined access category | 32-63 (= based on operator classification) |
| 4 | Access attempt for delay tolerant service | UE is configured for delay tolerant service, the PLMN is broadcasting one of the categories a, b or c, and the UE is a member of the broadcasted category in the selected PLMN or RPLMN/equivalent PLMN (NOTE 3) | 1 (= delay tolerant) |
| 5 | MO MMTel voice call | Access attempt is for MO MMTel voice call or for NAS signalling connection recovery during ongoing MO MMTel voice call (NOTE 2) | 4 (= MO MMTel voice) |
| 6 | MO MMTel video call | Access attempt is for MO MMTel video call or for NAS signalling connection recovery during ongoing MO MMTel video call (NOTE 2) | 5 (= MO MMTel video) |
| 7 | MO SMS over NAS or MO SMSoIP | Access attempt is for MO SMS or SMSoIP transfer or for NAS signalling connection recovery during ongoing MO SMS or SMSoIP transfer (NOTE 2) | 6 (= MO SMS and SMSoIP) |
| 8 | UE NAS initiated 5GMM specific procedures | Access attempt is for MO signalling | 3 (= MO_sig) |
| 9 | UE NAS initiated 5GMM connection management procedures or 5GMM NAS transport procedure | Access attempt is for MO data | 7 (= MO_data) |

NOTE 1: This includes 5GMM specific procedures while the service is ongoing and 5GMM connection management procedures required to establish a PDU session with request type = "emergency" or to re-establish radio bearers for such a PDU session.
NOTE 2: Access for the purpose of NAS signalling connection recovery during an ongoing service is mapped to the access category of the ongoing service in order to derive an RRC establishment cause, but barring checks will be skipped for this access attempt.
NOTE 3: If the UE selects a new PLMN, then the selected PLMN is used to check the membership, otherwise the UE uses the RLPMN or a PLMN equivalent to the RPLMN.

FIGURE 11

STOP OF BARRING TIMERS

PRIORITY

This nonprovisional application is a U.S. National Stage Filing under 35 U.S.C. § 371 of International Patent Application Serial No. PCT/IB2019/055008 filed Jun. 14, 2019 and entitled "Stop of Barring Timers" which claims priority to U.S. Provisional Patent Application No. 62/688,067 filed Jun. 21, 2018 both of which are hereby incorporated by reference in their entirety.

BACKGROUND

When performing access to a wireless communication system, a UE must signal to the network that it wants to acquire communication opportunities. There are many schemes for how this can be done. For example, a UE can utilize air-interface resources (e.g., times, frequencies) to send a short message that would indicate to the network that a UE wants to communicate. Further details about a certain communication need can then occur in subsequent communication.

The event which triggers a UE to perform a request to access a wireless communication system may for example be a need for an application, such as a software module in the UE, to transmit uplink user data, and/or receive downlink user data. Or, a need to exchange signaling messages with a network node. Or alternatively, a combination of both.

FIG. 1 illustrates a simplified wireless network with a UE, which communicates with an access node, which in turn is connected to a network node. For wireless communication systems pursuant to 3GPP EPS/LTE standard specifications, the access node corresponds typically to an Evolved NodeB (eNB) and the network node corresponds typically to either a Mobility Management Entity (MME) and/or a Serving Gateway (SGW).

In 3GPP LTE, a request for communication, when the UE is in idle mode, also known as RRC_IDLE state, is performed by initiating a random access procedure followed by an RRC Connection Establishment procedure. FIG. 2 illustrates random access and RRC connection establishment in 3GPP LTE. As depicted in FIG. 2, this sequence starts with a transmission of a Random Access Preamble, also known as "msg1", on specifically allocated channels or resources. This random access pre-amble is, when received by a base station or eNB, followed by a random access response, also known as "msg2", that includes an allocation of resources for continued signaling, in this case the RRC Connection Request, also known as "msg3" which is the first message in the RRC Connection Establishment procedure.

As is easily realized, an access attempt will cost air interface resources. Both the initial message as well as resources for further signaling will add to the wireless network load, simply to configure and setup communication resources for subsequent data transfer. It should be noted that even further communication is needed with network entities before any communication can take place, these are omitted from FIG. 2.

Under certain circumstances, it is desirable to prevent UE's from making these access attempts. For example, in case of an overload situation like radio resource congestion or shortage of processing capabilities, a network may wish to reduce overload by denying access to a cell. The network may also need to prioritize between specific users and/or services during overload situations. For example, to give priority to emergency calls compared to ordinary calls.

To this end, the network may employ what is in 3GPP referred to as access control. Access Class Barring (ACB) is an example of one such control. In short, access barring is about preventing or making it less likely that a UE will attempt to send an access request (e.g., to initiate the sequence above by sending a preamble). In this way, the total load in the system can be controlled. The network may for example divide UE's or different reasons for why a UE want access into different classes, or categories and dependent on this, the network can differentiate and make it less likely that, for example, certain UE's and/or certain events trigger access requests. For example, a given UE may belong to a certain access class and the network may communicate, via broadcasted system information, that certain classes at certain instances are barred, i.e., not allowed to make access, or allowed to make access with a lower probability if not barred altogether. When a UE receives this broadcasted system information, if it belongs to a barred access class, it may result in that a UE will not send an access request. There are multiple variants of access barring mechanisms specified for LTE:

1. Access Class Barring as per 3GPP Rel-8: In this mechanism, it is possible to bar all access requests from a UE. Normal UEs in Access Class (AC) range 0-9 are barred with a probability factor, also referred to as barring factor and a timer, also referred to as barring duration, whereas specific classes can be controlled separately. Beside the normal classes 0-9, additional classes have been specified to control the access to other type of users, e.g. emergency services, public utilities, security services, etc.
2. Service Specific Access Control (SSAC): The SSAC mechanism allows a network to prohibit Multi-Media Telephony (MMTel)—voice and MMTel-video accesses from a UE. The network broadcasts barring parameters (parameters similar to ACB) and a barring algorithm that is similar to ACB (barring factor and random timer). An actual decision if access is allowed is done in the IP Multi-Media Subsystem (IMS) layer of a UE.
3. Access control for Circuit-Switched FallBack (CSFB): The CSFB mechanism allows a network to prohibit CSFB users. A barring algorithm used in this case is similar to ACB.
4. Extended Access Barring (EAB): The EAB mechanism allows a network to prohibit low priority UEs. Barring is based on a bitmap in which each access class (AC 0-9) can be either barred or allowed.
5. Access class barring bypass: The ACB mechanism allows omitting access class barring for IMS voice and video users.
6. Application specific Congestion control for Data Communication (ACDC) barring: ACDC allows barring of traffic from/to certain application. In this solution, applications are categorized based on global application identification (ID) (in Android or iOS). The network broadcasts barring parameters (barring factor and timer) for each category.)

All the variants of access control operate for UEs in idle mode prior to random access and RRC connection establishment. SSAC additionally can be applied also for connected mode UEs, i.e. UEs in RRC_CONNECTED state in LTE.

In LTE, before a UE performs access towards an access node, it needs to read certain system information that is usually broadcast by the access node. The system information describes how access should be performed to initiate communication between the UE and the access node. Part of this system information may be information related to access barring. This barring information is usually broadcasted in the access network and there can be different barring information in different cells or areas. Usually, one access node will transmit its own barring information. The barring information may be arranged in a way such that it includes a set of access categories [1 . . . m] and for each category, information elements containing a barring factor and a barring time, for example as specified in 3GPP TS 36.331 v.14.1.0, 2016-12.

FIG. 3 illustrates an example of ACDC access barring information. This barring information per access category will be used by the UE attempting access and it is a way for the access node to limit and prioritize certain accesses over other.

FIG. 4 illustrates planes in a communications system according to 3GPP system architecture. A communication system, such as a 3GPP system, is normally functionally divided vertically into User Plane, Control Plane, and Management Plane, as illustrated in FIG. 4. This division allows independent scalability, evolution and flexible deployments. The user plane, which carries the user data traffic, contains functions and protocols related to user data transfer such as segmentation, reassembly, retransmission, multiplexing, ciphering and so forth. In the control plane, which carries signalling traffic, we find the protocols and functions needed to setup, release, control and configure the user plane. The control plane also contains functions and protocols related to for example UE mobility, UE authentication, control of user sessions and bearers (also known as service data flows or QoS flows). In the Management plane, which carries administrative traffic, we find for example operations and maintenance (O&M) and provisioning functions. There exists normally no distinct division between control plane and management plane but typically the control plane operates in a faster time scale (e.g. seconds) than the management plane (e.g. hours). Then the User Plane typically operates in the fastest time scale (e.g. milliseconds).

FIG. 5 illustrates another division of the 3GPP system, into domains and strata. There is a number of domains, most important are the UE, the Access Network (AN), and the Core Network (CN). It needs to be understood that typically the UE, AN, and CN all contains User Plane, Control Plane, and Management Plane functions.

The UE is a device allowing a user access to network services. It is typically a wireless terminal, such as a smartphone, equipped with a User Services Identity Module (USIM). The latter contains the credentials in order to unambiguously and securely identify itself. The functions of the USIM may be embedded in a standalone smart card, but could also be realized, e.g., as software in a software module.

The AN (also known as the Radio Access Network, RAN) contains access nodes, or base stations, also known as eNBs, gNBs, which manage the radio resources of the access network and provides the UE with a mechanism to access the core network. The AN is dependent of the radio access technology used in the wireless interface between the UE and AN. Thus, we have different flavors of access network for different radio access technologies, such as E-UTRAN supporting LTE or E-U IRA radio access technology and NG-RAN supporting New Radio (or 5G) type of radio access technology The CN consists of network nodes which provide support for the network features and telecommunication services, such as the management of user location information, control of network features and services, the switching and transmission of signaling and user data. The CN also provides the interface towards the External Network. There are different types of CNs, for different 3GPP system generations. For example, in 4G, also known as the Evolved Packet System (EPS), we find the Evolved Packet Core (EPC). Developed as part of the 5G System (5GS) we find the 5G Core (5GC).

Moreover, the CN is access-agnostic and the interface between the AN and CN enables integration of different 3GPP and non-3GPP access types. For example, an AN (also known as E-UTRAN) supporting LTE or E-UTRA radio access technology as well as an AN (also known as NG-RAN) supporting New Radio type of radio access technology can both be connected to a 5G type of CN (also known as 5GC).

The External Network represents here a network outside of the 3GPP domain, such as the public Internet.

As seen in FIG. 5, 3GPP system is also horizontally divided into the access Stratum (AS) and Non-Access Stratum (NAS) reflecting a protocol layering hierarchy. In the AS, we find functions which are related to the wireless portion of the system such as transport of data over the wireless connection and managing radio resources. The AS typically contains functions in the AN and the dialogue (using corresponding protocols) between the UE and the AN. In the NAS, which can be seen as higher in the protocol layering hierarchy than AS, we find the functions which are not directly dependent on the radio access technology and typically the functions in the core network and the dialogue (using corresponding protocols) between the UE and the CN.

In FIG. 5, also the Application is illustrated above NAS. The Application may contain parts in the UE, the CN, and the External network.

The control plane and User Plane of the AS and NAS are further divided into protocol layers. FIG. 6 illustrates example protocol layers in user plane and control plane of a 3GPP system. As illustrated in FIG. 6, in the AS, there is one protocol layer in the control plane, namely the Radio Resource Control (RRC) layer. As the RRC layer is part of the AS, it is dependent on the type of radio access technology used between the UE and AN. Thus, there are different versions of RRC for different radio access technologies such as, for example, one type of RRC layer for each of U E-UTRA and New Radio type of radio access technologies.

Further, in the AS there are also a number of protocol layers in the user plane, such as the Physical (PHY) layer, Medium Access Control (MAC) layer, Radio Link Control (RLC) layer, and Packet Data Convergence Control (PDCP) layer.

For New Radio, another new layer in the AS, above PDCP, named SDAP (Service Data Adaptation Protocol).

All protocol layers, both in the User Plane and Control Plane of the AS are terminated in the AN in the network side, such as the eNB or the gNB.

In the NAS, there are multiple protocol layers in the control plane. In EPS (Evolved Packet System, also known as 4G or LTE) these layers are known as EMM (EPS Mobility Management) and ESM (EPS Session Management). In the 5G system, as illustrated in FIG. 6, the protocol layers in the NAS control plane are 5GMM (5G Mobility Management) and 5GSM (5G Session Management).

Further, in the NAS, there are multiple protocol layers in the user plane, such as the Internet Protocol (IP).

The Application resides above the NAS and interacts with the user plane and in some cases also the control plane.

In the 3GPP system, for each protocol layer there is a state machine, reflecting the UE states of the particular protocol layer. In the state machine of the RRC layer for NR radio access technology, according to 3GPP TS 38.804 v14.0.0 (2017-03), three states are specified. FIG. 7 illustrates the three RRC states for NR: RRC_IDLE, RRC_INACTIVE, and RRC_CONNECTED.

The RRC states reflect the UE's activity level where RRC_IDLE is typically used when the UE has no ongoing data traffic (thus no activity) and RRC_CONNECTED when the UE needs to send and/or receive data. RRC_INACTIVE may be used as an alternative state instead of RRC_IDLE when the UE's activity pattern would add significant signaling overhead using RRC_IDLE state.

The procedure to enter RRC_CONNECTED from RRC_IDLE is known as the "RRC connection establishment" procedure. Before the RRC connection establishment this access attempt will be typically subject to Access control, including an access barring check.

A UE in RRC_CONNECTED will typically after a while, typically by order of a network node (such as the gNB), transition to RRC_INACTIVE, due to inactivity, using what is known as the "RRC Inactivation" procedure. A UE in RRC_INACTIVE needs to again enter RRC_CONNECTED in order to transmit or receive data. Alternatively, the UE may remain in Inactive for as long as it remains in a certain network area, or it may be paged by the network to transition from RRC_INACTIVE to RRC_IDLE or enter RRC_IDLE due to other reasons, e.g. procedural errors or failures.

The procedure for entering RRC_CONNECTED from RRC_INACTIVE is sometimes referred to as an "RRC Resume" (or "Activation") procedure. The RRC Resume procedure is currently being standardized and details are yet to be set, but it is expected to require much less signaling than the RRC connection establishment procedure, since e.g. processing resources, transport resources and security association in the network are preserved in RRC_INACTIVE and thus there is typically no need to establish those in the RRC Resume procedure. Therefore, the latency before user data can be exchanged between the UE and the network is typically much shorter for a UE in RRC_INACTIVE than for a UE in RRC_IDLE. On the other hand, a UE in RRC_INACTIVE consumes a little more power as well as resources (e.g. memory) than a UE in RRC_IDLE.

For LTE, a similar RRC state machine is specified and the functionality similar to the NR RRC_INACTIVE state as well as an RRC Resume procedure already exists.

An ongoing evolution of the access control mechanisms, in particular for 5th generation cellular standards according to 3GPP, is to gather the existing access control mechanisms into one single mechanism that can be configurable and adaptable to various network operator preferences. It has thus been agreed that 5G will include a single access control framework, what is known as Unified access control.

Unified access control will apply to UEs accessing 5G Core via NR (New Radio) or E-UTRA/LTE. Moreover, Unified access control is applied in all UE states, whereas for LTE, with one exception (SSAC), the access control mechanisms only apply for idle mode UEs.

Unified access control is currently being specified in 3GPP TS 22.261 (5G service requirements), 3GPP TS 24.501 (5G NAS protocols), 3GPP TS 38.331 (NR RRC Protocol) and 3GPP TS 36.331 (LTE RRC Protocol).

According to the solutions being discussed in 3GPP, the access node (e.g. gNB or eNB) indicates barring condition for each cell using access barring parameters to UEs, by system information broadcast in the RRC layer within the access stratum (AS). This barring condition makes it able to prevent UEs from accessing the network using relevant barring parameters that vary depending on Access Identity and Access Category.

Further, in the UE, there is a process which detects what is known as "access attempts". An example of an access attempt is a request to setup a new session, such as a new PDU session or an MMTEL Voice call. For each detected access attempt one or more Access Identities and only one Access Category are selected.

Access Identities are configured at the UE and are typically used for "special" UEs, such as UEs for mission-critical services or for operator use. In TS 22.261, the access identities are being specified as illustrated in FIG. 8.

Access Categories are defined by the combination of conditions related to UE and the type of access attempt. In TS 22.261, the access categories are being specified as illustrated in FIG. 9.

As illustrated in FIG. 9, there are up to 32 standardized access categories (0-8, 9-31), and up to 32 operator-defined access categories (32-63). How to select the standardized access categories are specified as rules in the standard. On the other hand, the rules for how to select the operator-defined access categories is configured by the network. Each of these configured rules will be used as one criteria for selecting a particular operator-defined access category. An example of a criteria is that an access attempt associated with a PDU session for a certain value of DNN (Data Network Node) is mapped to a certain operator-defined access category. Each rule is associated with a precedence, used to prioritize in which order the UE evaluates the rules.

This means, that when selecting the appropriate access category for a given access attempt, the UE selects either a standardized access category or an operator-defined access category, in a deterministic way based on specified and configurable rules.

Definition of the access attempts, for each access category, is now being done by 3GPP working groups, mainly CT1 and RAN2). It is understood that access attempts may be detected and identified in several layers in the UE, including 5GSM, 5GMM, SMSoIP, MMTEL (Multimedia Telephony) and RRC. But "double barring" should be avoided and therefore a given access attempt should only detected at one place in the protocol stack, and only once.

Typically, the layer which detects the access attempt performs the mapping to access category, triggers access barring check and performs enforcement of blocking the attempt if not authorized.

The overall procedure for unified access control is illustrated in FIG. 10. In a first step, a network node optionally provides rules for the operator-specific access categories. In FIG. 3, this information is illustrated as originating from the network node, such as the AMF, but may very well also originate from other network nodes and be transmitted to the UE via network node or possibly via another node (e.g. an operator's policy functionality configuring the UE via WLAN access network). If the network includes a higher-level controller or policy functionality it may originate from another node hosting such controller or policy functionality. The higher layer rules may be signaled to the UE via NAS signaling, or it may be signaled using other protocols, For example, the UE may include an entity that can be configured with and host access category rules signaled using an OMA-DM device management protocol. It is currently assumed in 3GPP CT1 that operator-defined access categories can be signaled to the UE using NAS signalling.

So far 3GPP has specified in TS 24.501 that each operator-defined category consists of the following parameters:
- a) a precedence value which indicates in which order the UE shall evaluate the operator-defined categories for a match;
- b) an access category number in the 32-63 range that uniquely identifies the access category in the PLMN in which the access categories are being sent to the UE; and
- c) one or more access category criteria type and associated access category criteria type values. The access category criteria type can be set to one of the following:
  1) DNN (Data Network Node) name;
  2) 5QI (5G Quality of Service Indicator);
  3) OS (Operating System) Id+OS App Id of application triggering the access attempt; or
  4) S-NSSAI (Single Network Slice Selection Assistance Information) which is used to identify a network slice.

It should be noted that signalling from the network node may also include signaling from the access node, in particular when it comes to access category selection for accesses that are triggered by, e.g., signaling with the access node.

When an event occurs triggering a need for the UE to request an access to the network, such as a need to transmit uplink data when the UE is in idle mode, or to setup an MMTel Voice call when the UE is in RRC_CONNECTED state, the UE first detects whether this event is an access attempt in a second step. An access attempt would always undergo access barring check before it is allowed. Some events are not classified and detected as access attempts. For example, when uplink data is to be sent for an existing PDU session in RRC_CONNECTED state.

If the event was classified and detected as an access attempt, the UE 102 determines the access category in a third step, based on the standardized rules as well as any configured rules obtained in the first step. CT1 and RAN2 are currently specifying how the determination of an access category is performed. For example, in TS 24.501 there is a mapping table for the determination of access category as illustrated in FIG. 11.

In order to determine the access category applicable for the access attempt, the UE checks the rules in in FIG. 11 and uses the access category for which there is a match for barring check. If the access attempt matches more than one rule, the access category of the lowest rule number will be selected.

After determining the access category for this particular access attempt, the UE then reads access barring information, which is for NR part of the broadcasted system information block 1 (SIB1). Typically, the UE is required to maintain the latest version of the broadcasted system information which implies that the UE in many cases does not actually have to re-read the system information and instead can use cached system information.

The UE then performs an access barring check for the access attempt, using the determined access category and the access barring information as input.

If the outcome of barring check is "access attempt is allowed" the UE will continue and perform the access, resulting typically in an uplink signalling message such as an RRC connection request or a NAS message such as a PDU Session Request, depending on the UE state and the type of access attempt.

On the other hand, if the outcome of barring check is "access attempt is barred" the UE will not perform an access and starts a barring timer [T30$x$] with a value indicated in the access barring information. This barring timer is associated with the access category determined for the access attempt that was barred.

When a barring timer [T30$x$] expires, this triggers "barring alleviation" for the access category associated with the barring timer. This may trigger the UE to perform a new access attempt, and subsequent access barring check, with this access category.

In LTE, it is specified that barring timers are stopped when the UE performs cell reselection. This is because, the new cell may have different barring conditions (as indicated in the broadcasted system information).

In NR, as well as in LTE, the broadcasted system information is organized in a Master Information Block (MIB) and a number of system information blocks (SIB1, SIB2, etc.).

In 3GPP TS 38.331 it is specified how the UE reads system information and how it detects change of system information.

In general, the UE may store the latest version of each SIB and upon receiving a System Information change indication (systemInfoModification) in a paging message it will check whether any of the SIBs have been modified compared to the stored versions of each SIB.

Upon cell reselection, the UE always discards and re-reads SIB 1 but for the other SIBs it may or may not re-use the stored version of the SIB, depending on the value tag associated with each SIB, and if the new cell belongs to the same System Information Area as the cell where the UE received the stored version of the SIB. The System Information Area for a cell is then indicated by a System Information Area ID (SIAID). If the SIAID of the new cell is the same as the SIAID associated with a stored SIB and the value tag for that SIB is the same in the new cell as in the stored version of the SIB, it may use the stored SIB. It is however possible for the network to indicate whether a specific SIB only has a cell scope, in which case there is an exception to this and the UE may then not reuse a stored version of that SIB in other cells.

In 3GPP TS 38.331 section 5.2.2.2.1 it is specified that:
  The UE shall apply the SI acquisition procedure as defined in clause 5.2.2.3 upon cell selection (e.g. upon power on), cell-reselection, return from out of coverage, after reconfiguration with sync completion, after entering NR-RAN from another RAT, upon receiving an indication that the system information has changed, upon receiving a PWS notification; whenever the UE does not have a valid version of a stored SI.
  When the UE acquires a MIB or a SIB1 or a SI message in a currently camped/serving cell as described in clause 5.2.2.3, the UE shall store the acquired SI. A version of the SI that the UE stored is out of date after 3 hours. The UE may use such a stored version of the SI except MIB and SIB1 e.g. after cell re-selection, upon return from out of coverage or after the reception of SI change indication.

Certain problems exist. For example, the reason for stopping the timer at cell reselection in LTE is that different cells may have different barring conditions. In unified access control, barring is performed for access attempts and not for access to cells. Also, unified access control should apply in all UE states and not only those states where cell reselection may be performed.

By having cell reselection as the criteria for stopping barring timers [T30x], we therefore forget about UEs in RRC_CONNECTED state—shouldn't they also stop their barring timers such as after handover? In LTE this is not an issue since normal access barring is not performed in RRC_CONNECTED. But the unified access control in 5G applies to UE states.

Therefore, to inherit the LTE behavior and have cell reselection as the criteria for stopping barring timers [T30x] is not really suitable for Unified access control that applies in all UE states.

SUMMARY

Certain aspects of the present disclosure and their embodiments may provide solutions to these or other challenges. For example, according to certain embodiments, a solution is provided that includes defining criteria for stopping barring timers, which can be used in all UE states.

According to certain embodiments, a method by a wireless device is provided to perform access barring. The method includes starting a barring timer when an access attempt is barred and, based on a change in barring information, stopping the barring timer.

According to certain embodiments, a wireless device includes memory operable to store instructions and processing circuitry operable to execute the instructions to cause the wireless device to start a barring timer when an access attempt is barred and, based on a change in barring information, stop the barring timer.

Certain embodiments may provide one or more of the following technical advantages. For example, one technical advantage may be that certain embodiments use criteria for stopping barring timers, which can be used in all UE states and therefore it ensures a consistent UE behavior in all UE states. In particular, UEs in RRC_CONNECTED stops barring timers whenever barring information is changed, as specified by the criteria.

Other advantages may be readily apparent to one having skill in the art. Certain embodiments may have none, some, or all of the recited advantages.

BRIEF DESCRIPTION OF THE DRAWINGS

FIG. 8 illustrates access identities as discussed in TS 22.261;

FIG. 9 illustrates access categories as specified in TS 22.261;

FIG. 11 illustrates a mapping table for the determination of access category as discussed in TS 24.501;

DETAILED DESCRIPTION

Figure 1:
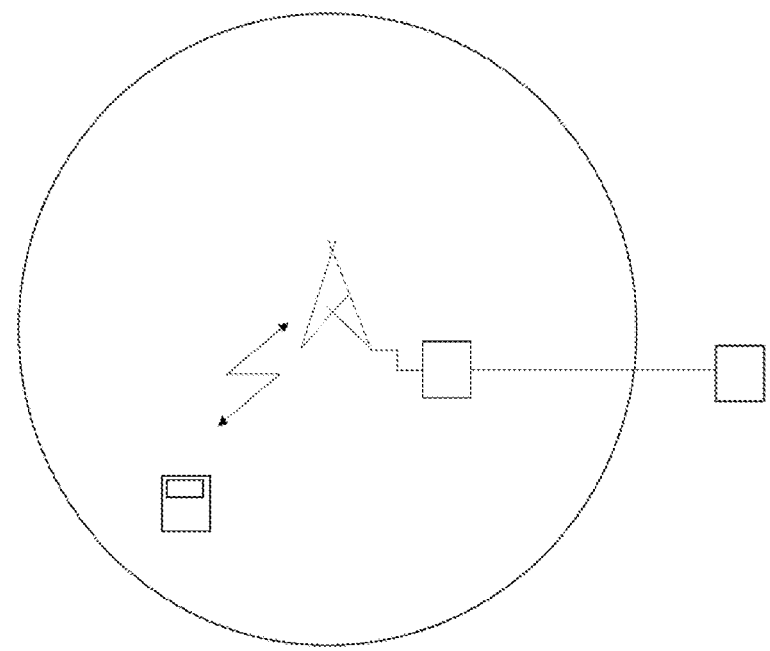
FIG. 1 illustrates a simplified wireless network with a user equipment (UE), which communicates with an access node, which in turn is connected to a network node.
Figure 2:
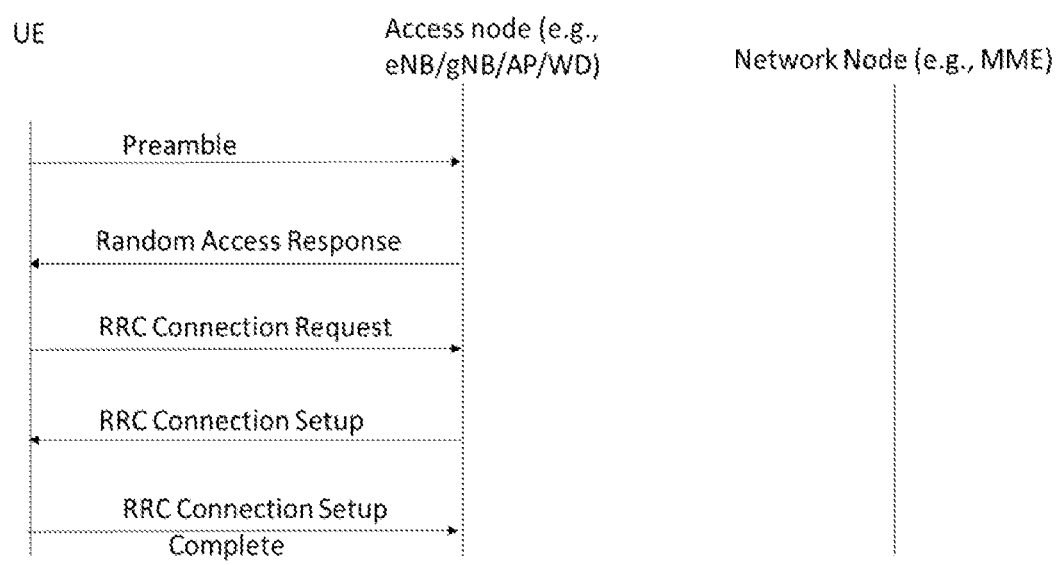
FIG. 2 illustrates random access and radio resource control (RRC) connection establishment in 3GPP LTE.
Figures 3, 4:
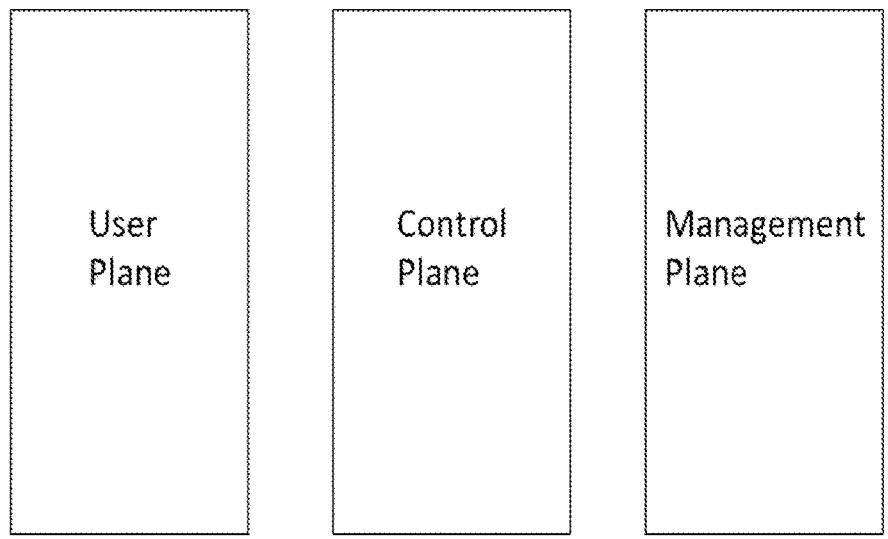
FIG. 3 illustrates an example of ACDC access barring information.
FIG. 4 illustrates planes in a communications system according to 3GPP system architecture.
Figure 5:
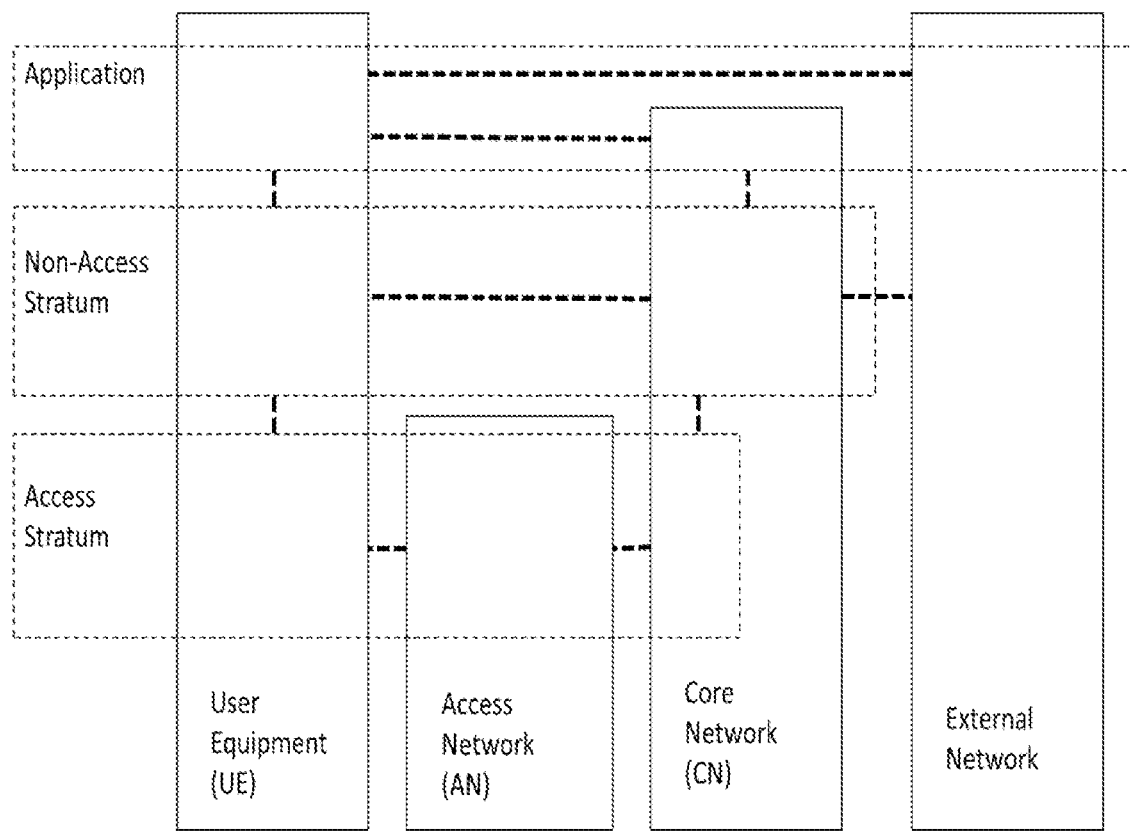
FIG. 5 illustrates another division of the 3GPP system, into domains and strata.
Figure 6:
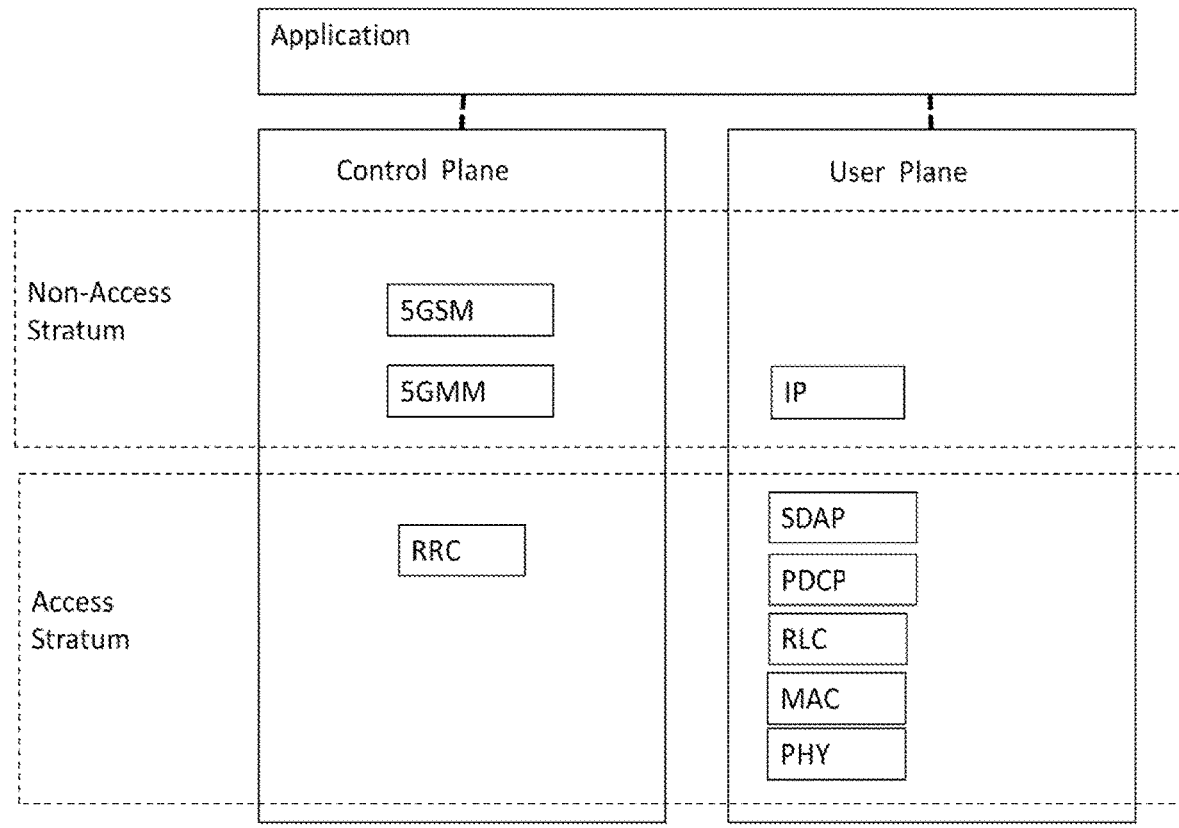
FIG. 6 illustrates example protocol layers in user plane and control plane of a 3GPP system.
Figure 7:
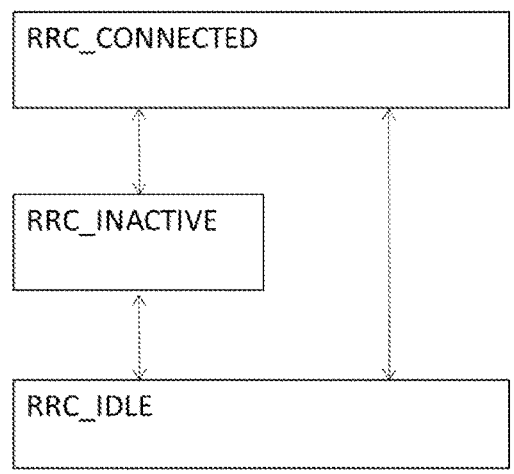
FIG. 7 illustrates the three RRC states for NR: RRC_IDLE, RRC_INACTIVE, and RRC_CONNECTED.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

In some embodiments, a more general term "network node" may be used and may correspond to any type of radio network node or any network node, which communicates with a UE (directly or via another node) and/or with another network node. Examples of network nodes are NodeB, MeNB, ENB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc), O&M, OSS, SON, positioning node (e.g. E-SMLC), MDT, test equipment (physical node or software), etc.

In some embodiments, the non-limiting term user equipment (UE) or wireless device may be used and may refer to any type of wireless device communicating with a network node and/or with another UE in a cellular or mobile communication system. Examples of UE are target device, device to device (D2D) UE, machine type UE or UE capable of machine to machine (M2M) communication, PDA, PAD, Tablet, mobile terminals, smart phone, laptop embedded equipped (LEE), laptop mounted equipment (LME), USB dongles, UE category M1, UE category M2, ProSe UE, V2V UE, V2X UE, etc.

According to certain embodiments, a solution is provided that includes defining criteria for stopping barring timers, which can be used in all UE states. Such criteria may be referred to herein as barring information change criteria. According to certain embodiments, for example, the barring information change criteria is defined as: the UE is triggered to acquire SIB1 in a currently camped/serving cell. When this barring information change criteria is fulfilled, the UE may read the new barring information. The UE then stops any running barring timers.

Figure 12:
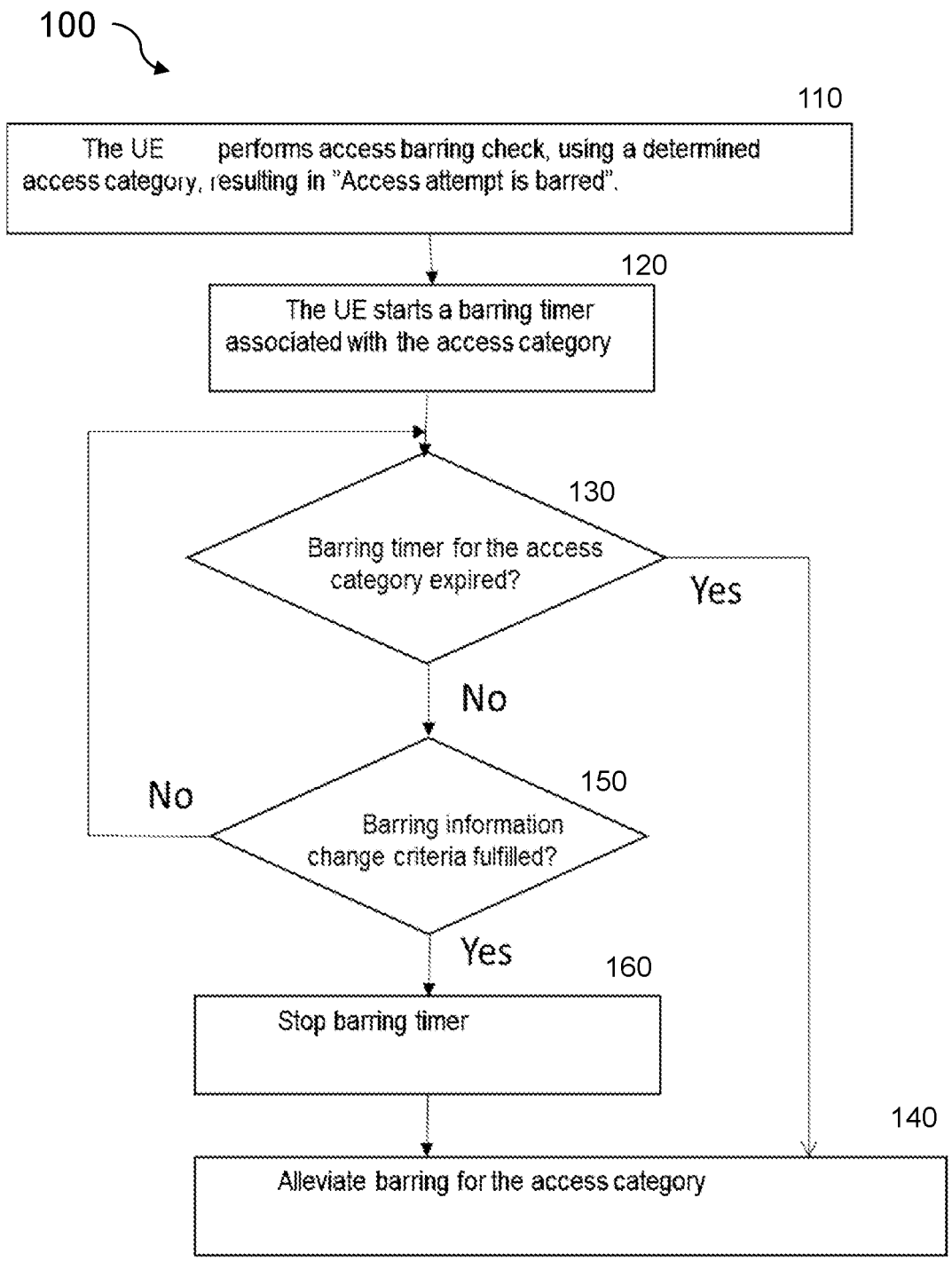
FIG. 12 illustrates an example method for stopping barring timers, according to certain embodiments.

FIG. 12 illustrates an example method 100 for stopping barring timers, according to certain embodiments.

Figure 10:
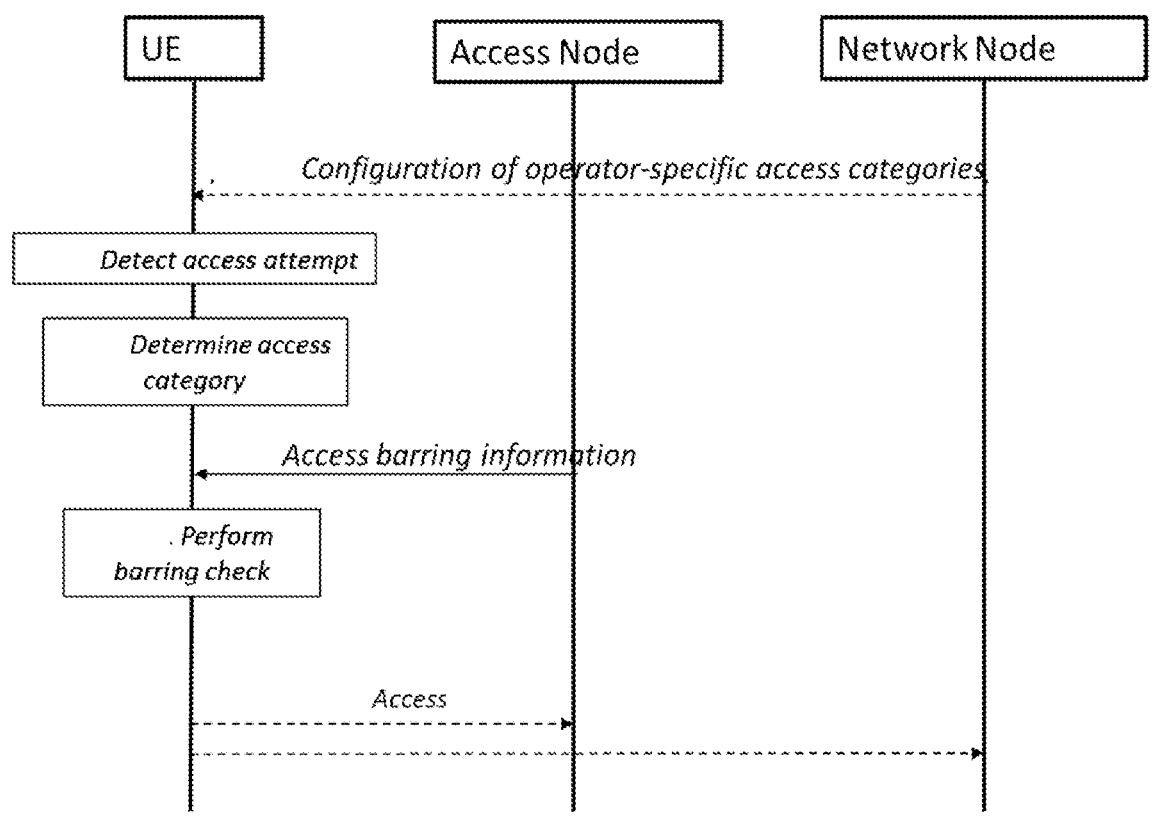
FIG. 10 illustrates the overall procedure for unified access control.

In step 110, the UE performs an access barring check using a determined access category, e.g. as described in FIG. 10. In this example in order to apply the invention, the access barring check results in that "access attempt is barred".

In step 120, the UE 102 then starts the barring timer, such as [T30x] or T390 or similar, associated with the access category used in the access barring check in step 1201.

In step 130, the UE 102 checks if the barring timer is still running or if it has expired. If it expired, the UE goes to step 140 where barring is alleviated for the access category.

If barring timer is still running, the UE checks whether the barring information change criteria is fulfilled at step 150. In a particular embodiment, the barring information change criteria is defined as: "the UE is triggered to acquire SIB1 in a currently camped/serving cell.". In another particular embodiment, the barring information change criteria is defined as: "the UE performs cell re-selection OR the UE receives a paging message containing systemInfoModification". In yet another particular embodiment, the barring information change criteria is defined as "the UE acquires a SIB1 in a currently camped/serving cell".

If this barring information change criteria not fulfilled, the UE goes back to 130. When this barring information change criteria is fulfilled, the UE goes to step 160 and stops any running barring timers and goes to step 140 where barring is alleviated. The UE may also read the new access barring information (e.g. in SIB1) and discard any stored access barring information (e.g. a stored version of SIB1).

In 3GPP TS 38.331 (RRC specification), the barring information change criteria can be captured as follows (corresponding to step 150):

"5.3.14.3 Barring information change while T30x is running

The UE shall:
1> if the UE is triggered to acquire SIB1 in a currently camped/serving cell while [T30x] is running:
2> stop timer [T30x];
2> perform the actions as specified in 5.3.14.4."

In section 5.3.14.4, the barring alleviation is performed, which corresponds to step 140.

According to certain other embodiments, an alternative solution may include the barring information change criteria being defined as: after applying the barring information change criteria as in the examples above, the UE then checks the information element systemInformationAreaID in SIB1 and compares with the corresponding information element in the stored SIB1. If they differ, the barring information change criteria is fulfilled.

According to still other embodiments, an alternative solution may include the barring information change criteria being combined with an access category barring parameter change criteria.

Figure 13:
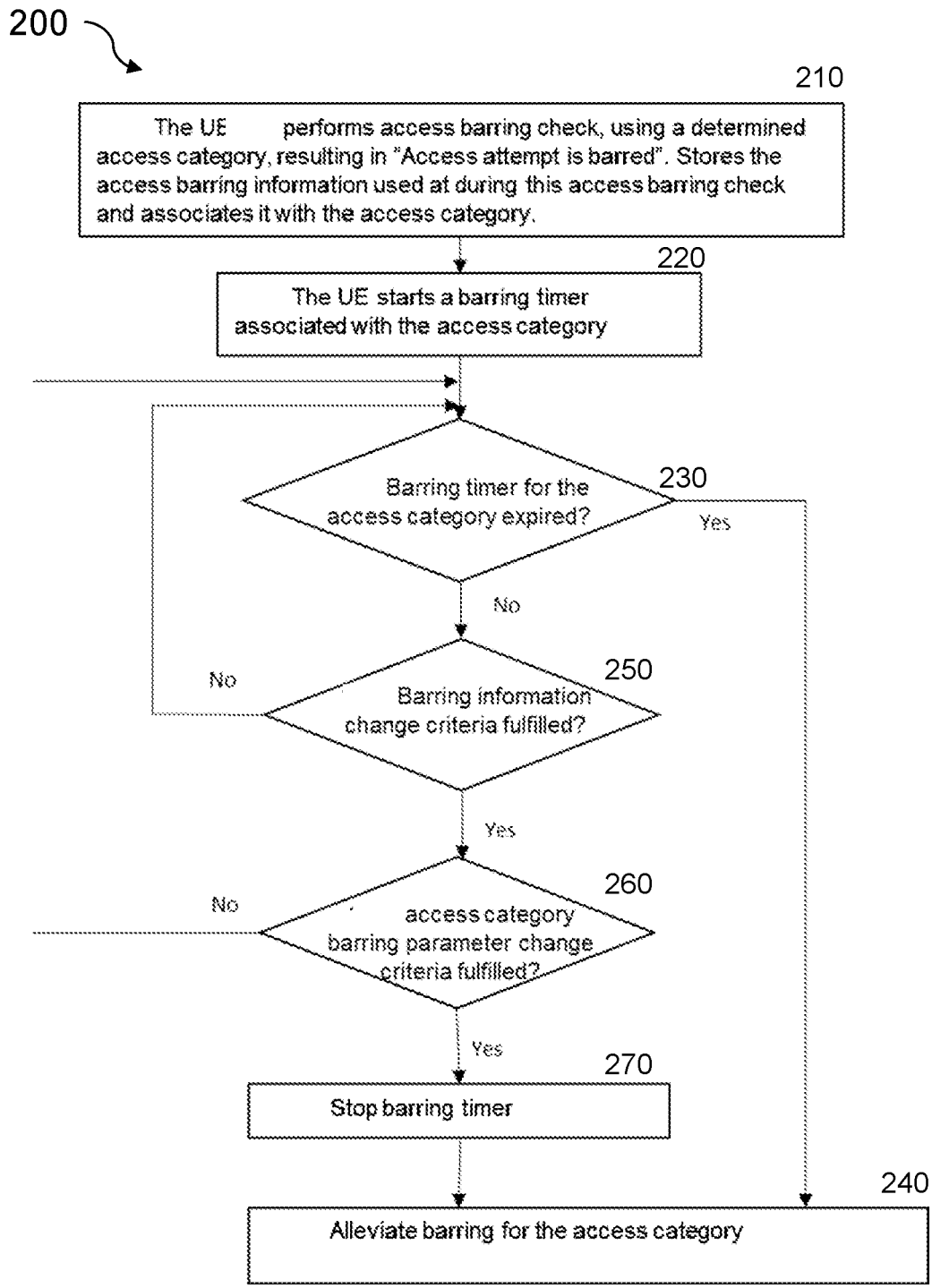
FIG. 13 illustrates

FIG. 13 illustrates another example method 200 for stopping barring timers, according to certain embodiments. The main steps in FIG. 13 corresponds to those in FIG. 12 with the following differences:

When an access barring check using a given access category results in that the access attempt is barred in step 210, the UE, besides starts a barring timer associated with the access category it also stores the access barring information used at during this access barring check and associates it with the access category. A UE variable can be used to store this information. In 3GPP TS 38.331 section 5.3.14.5 "Access Barring Check", the barring information used during access barring check is referred to as "UAC barring parameter".

When a barring information change criteria is fulfilled in step 240 (as in the main embodiment or in the first alternative embodiment), after reading new access barring information (e.g. in SIB1) in step 160, the UE in step 260 then applies an access category barring parameter change criteria for each access category X associated with a running barring timer, as follows:

using the new access barring information (e.g. in SIB1), compares the access barring info to be used as "UAC parameter" if access barring check would have been performed using this access category X, with the in step 210 stored barring information associated with the access category X.

If no difference the UE goes back to step 230. If there is a difference, it means that the access category barring parameter change criteria for the access category X is fulfilled and the UE stops the barring timer for the access category X in step 270 and goes to step 240 where barring is alleviated for access category X.

According to certain other embodiments, the system information provided by the network, e.g. SIB1, contains information to indicate whether the UE shall alleviate the barring or not. The information may then e.g. indicate what events that correspond to a "barring information change criteria", i.e. for a UE to determine at what cases it shall alleviate barring or not.

According to certain other embodiments, yet another alternative solution may include the information provided by the network indicating to the UE whether a change in barring information for an access category, for which the UE has a barring timer running, shall lead to a barring alleviation or not. The indication may then be dependent on how the barring information is changed, e.g. if there is a change in barring factor that is at least X % less restrictive compared to when the UE was barred, the UE may alleviate the barring. The indication whether a UE may alleviate its barring condition or not may then be given for all Access Category or for just one or some of the Access Categories.

The information about when and/or how the UE may alleviate a barring condition (while the barring timer is still running) may also be given through other broadcasted messages or be provided to a UE through e.g. dedicated signaling, be configured in the UE, hard coded in the UE or it may be specified.

Figure 14:
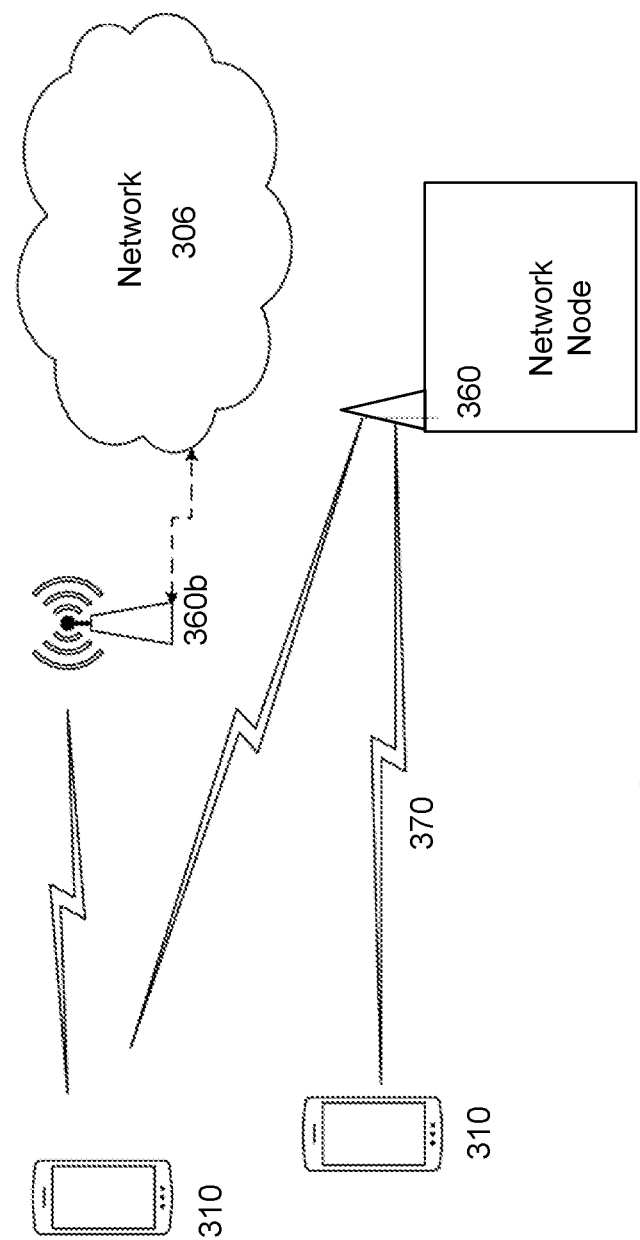
FIG. 14 illustrates an example wireless network, according to certain embodiments.

FIG. 14 illustrates a wireless network, in accordance with some embodiments. Although the subject matter described herein may be implemented in any appropriate type of system using any suitable components, the embodiments disclosed herein are described in relation to a wireless network, such as the example wireless network illustrated in FIG. 14. For simplicity, the wireless network of FIG. 14 only depicts network 306, network nodes 360 and 360b, and WDs 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device (WD) 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and WD 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 15:
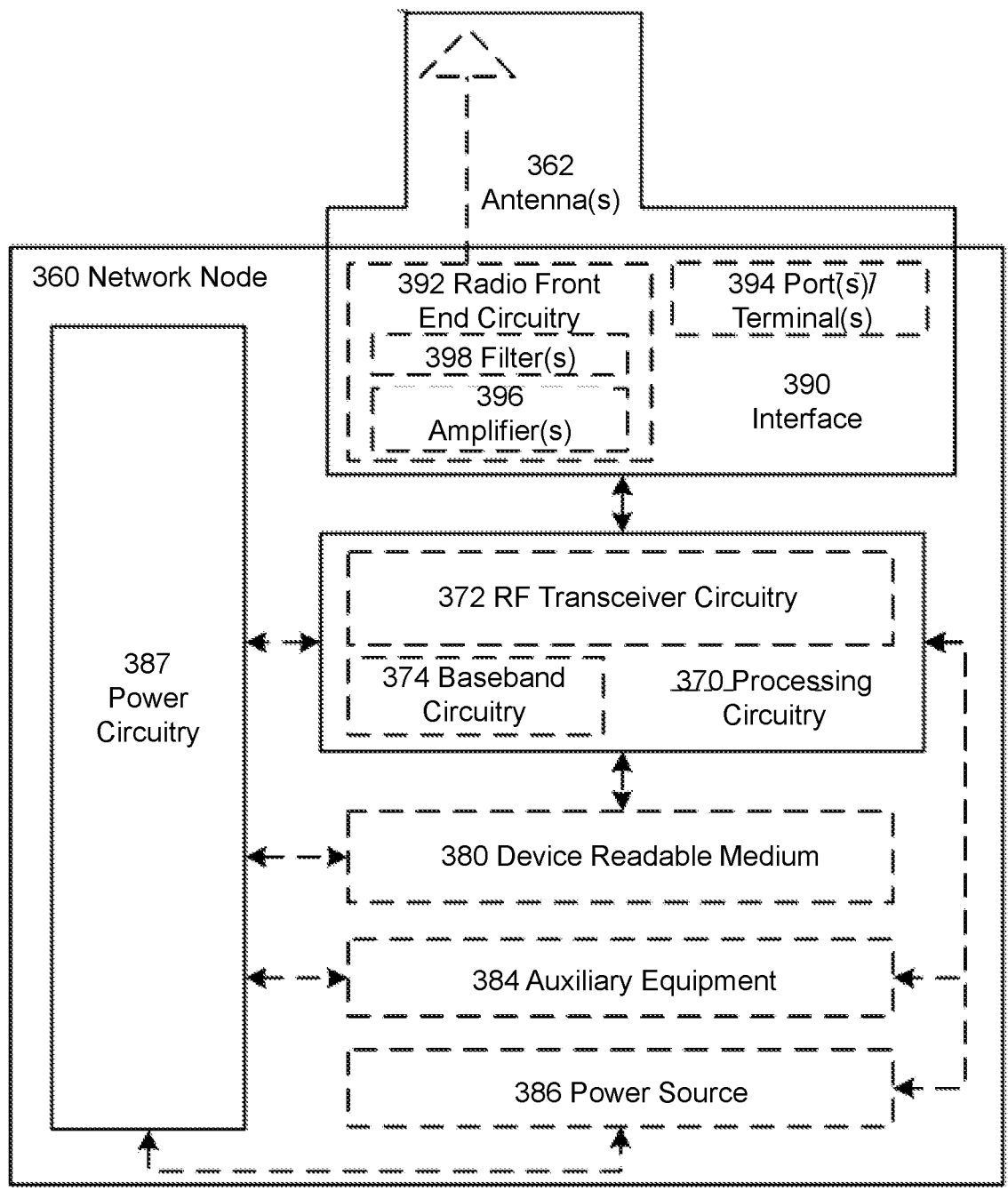
FIG. 15 illustrates an example network node, according to certain embodiments.

FIG. 15 illustrates an example network node, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NRNodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 15, network node 360 includes processing circuitry 370, device readable medium 380, interface 390, auxiliary equipment 384, power source 386, power circuitry 387, and antenna 362. Although network node 360 illustrated in the example wireless network of FIG. 14 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, WCDMA, LTE, NR, WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units.

In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360 but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or WDs 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or WDs via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 14 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

Figure 16:
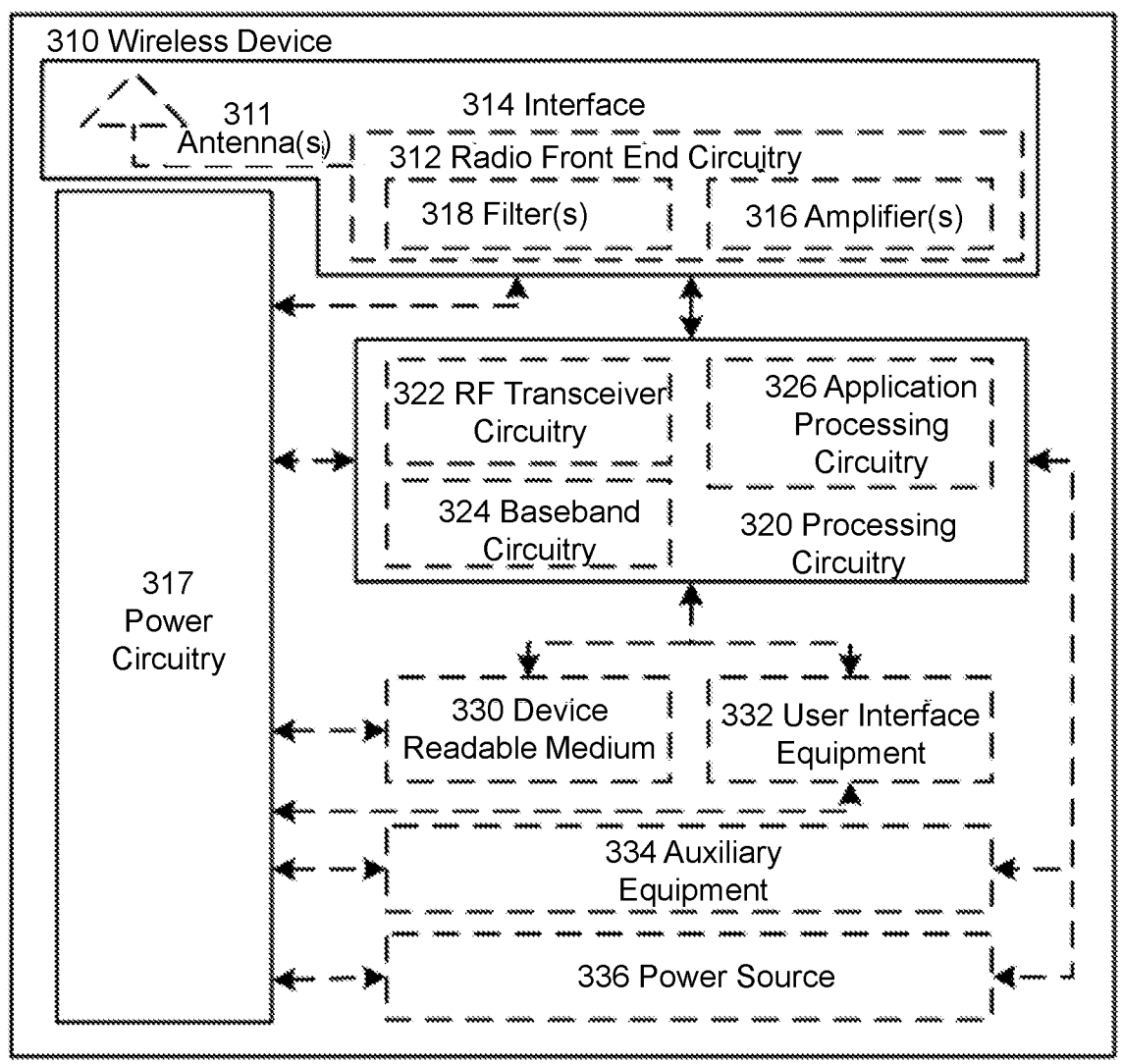
FIG. 16 illustrates an example wireless device, according to certain embodiments.

FIG. 16 illustrates an example wireless device (WD), according to certain embodiments. As used herein, WD refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. WD 310 may include multiple sets of one or more of the illustrated components for different wireless technologies supported by WD 310, such as, for example, GSM, WCDMA, LTE, NR, WiFi, WiMAX, or Bluetooth wireless technologies, just to mention a few. These wireless technologies may be integrated into the same or different chips or set of chips as other components within WD 310.

Antenna 311 may include one or more antennas or antenna arrays, configured to send and/or receive wireless signals, and is connected to interface 314. In certain alternative embodiments, antenna 311 may be separate from WD 310 and be connectable to WD 310 through an interface or port. Antenna 311, interface 314, and/or processing circuitry 320 may be configured to perform any receiving or transmitting operations described herein as being performed by a WD. Any information, data and/or signals may be received from a network node and/or another WD. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320 and is configured to condition signals communicated between antenna 311 and processing circuitry 320. Radio front end circuitry 312 may be coupled to or a part of antenna 311. In some embodiments, WD 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or WDs via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 310 components, such as device readable medium 330, WD 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of WD 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a WD may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of WD 310, but are enjoyed by WD 310 as a whole, and/or by end users and the wireless network generally.

Processing circuitry 320 may be configured to perform any determining, calculating, or similar operations (e.g., certain obtaining operations) described herein as being performed by a WD. These operations, as performed by processing circuitry 320, may include processing information obtained by processing circuitry 320 by, for example, converting the obtained information into other information, comparing the obtained information or converted information to information stored by WD 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with WD 310. Such interaction may be of many forms, such as visual, audial, tactile, etc. User interface equipment 332 may be operable to produce output to the user and to allow the user to provide input to WD 310. The type of interaction may vary depending on the type of user interface equipment 332 installed in WD 310. For example, if WD 310 is a smart phone, the interaction may be via a touch screen; if WD 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into WD 310 and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from WD 310, and to allow processing circuitry 320 to output information from WD 310. User interface equipment 332 may include, for example, a speaker, a display, vibrating circuitry, a USB port, a headphone interface, or other output circuitry. Using one or more input and output interfaces, devices, and circuits, of user interface equipment 332, WD 310 may communicate with end users and/or the wireless network and allow them to benefit from the functionality described herein.

Auxiliary equipment 334 is operable to provide more specific functionality which may not be generally performed by WDs. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. WD 310 may further comprise power circuitry 337 for delivering power from power source 336 to the various parts of WD 310 which need power from power source 336 to carry out any functionality described or indicated herein. Power circuitry 337 may in certain embodiments comprise power management circuitry. Power circuitry 337 may additionally or alternatively be operable to receive power from an external power source; in which case WD 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of WD 310 to which power is supplied.

Figure 17:
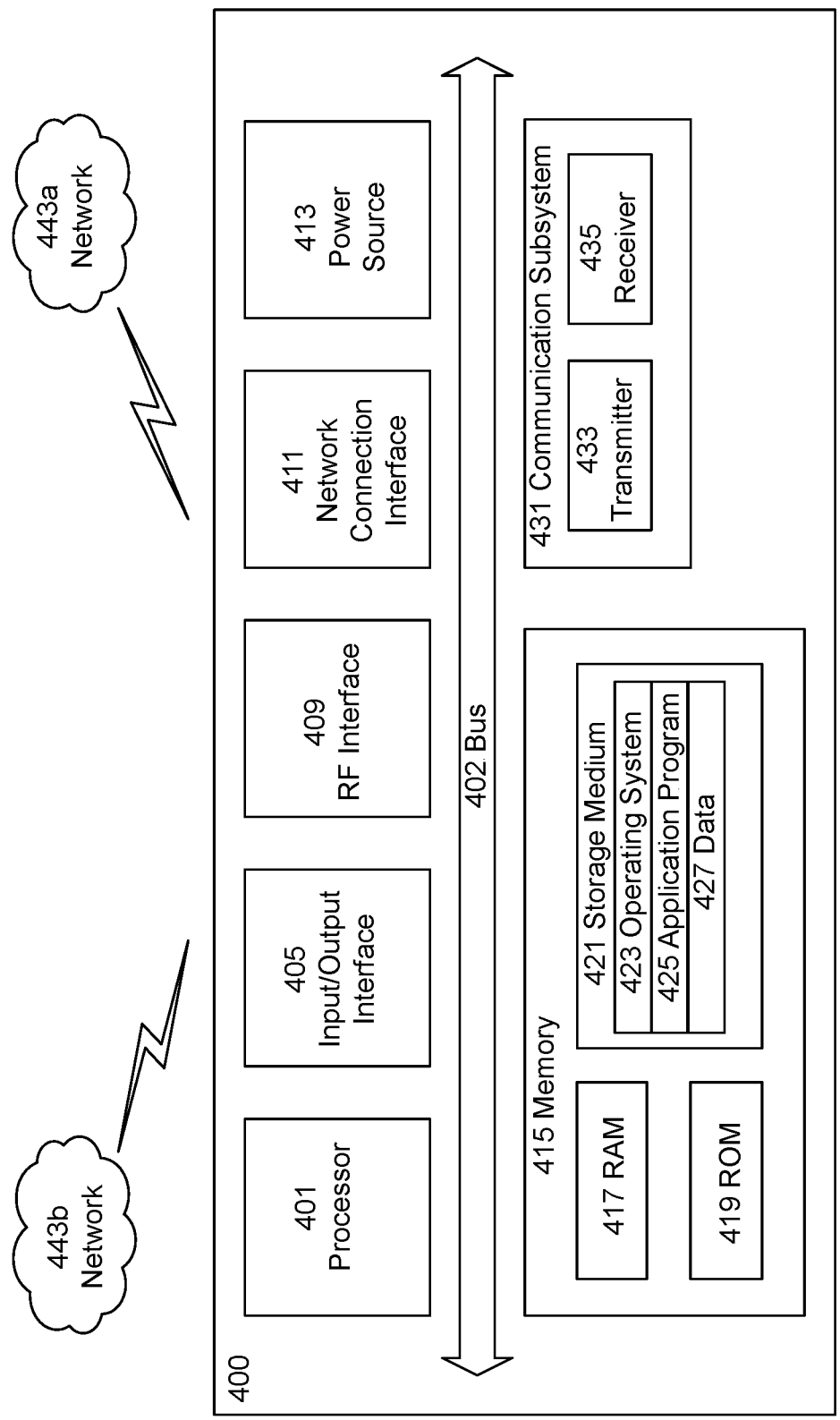
FIG. 17 illustrate an example user equipment, according to certain embodiments.

FIG. 17 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 17, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE may be used interchangeable. Accordingly, although FIG. 17 is a UE, the components discussed herein are equally applicable to a WD, and vice-versa.

In FIG. 17, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 15, or only a subset of the components. The level of integration between the components may vary from one UE to another UE. Further, certain UEs may contain multiple instances of a component, such as multiple processors, memories, transceivers, transmitters, receivers, etc.

In FIG. 17, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 17, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 17, processing circuitry 401 may be configured to communicate with network 443*b* using communication subsystem 431. Network 443*a* and network 443*b* may be the same network or networks or different network or networks. Communication subsystem 431 may be configured to include one or more transceivers used to communicate with network 443*b*. For example, communication subsystem 431 may be configured to include one or more transceivers used to communicate with one or more remote transceivers of another device capable of wireless communication such as another WD, UE, or base station of a radio access network (RAN) according to one or more communication protocols, such as IEEE 802.4, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443*b* may encompass wired and/or wireless networks such as a local-area network (LAN), a wide-area network (WAN), a computer network, a wireless network, a telecommunications network, another like network or any combination thereof. For example, network 443*b* may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 18:
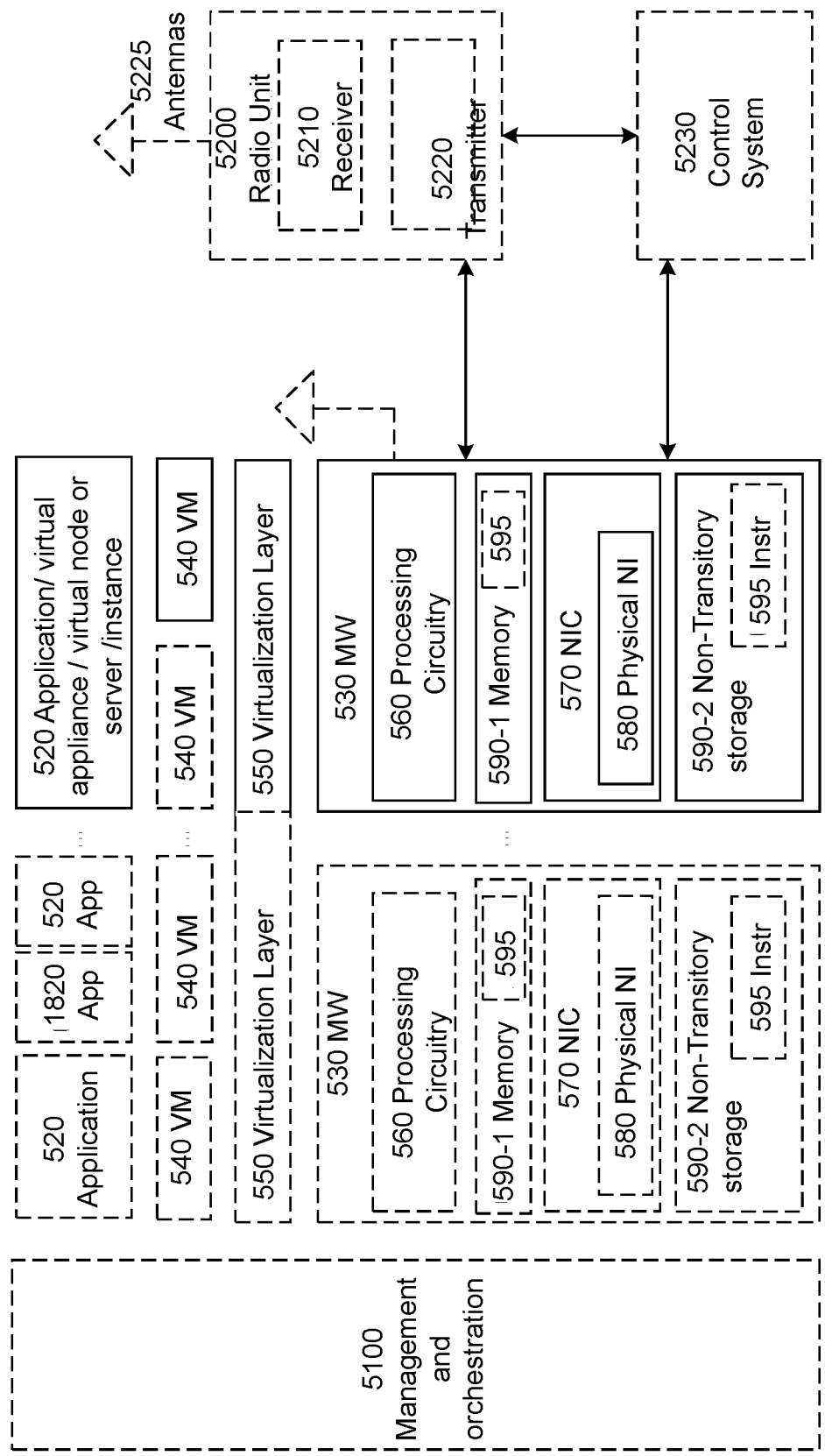
FIG. 18 illustrates a virtualization environment in which functions implemented by some embodiments may be virtualized, according to certain embodiments.

FIG. 18 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 18 hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 18.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signaling can be affected with the use of control system 5230 which may alternatively be used for communication between the hardware nodes 530 and radio units 5200.

Figure 19:
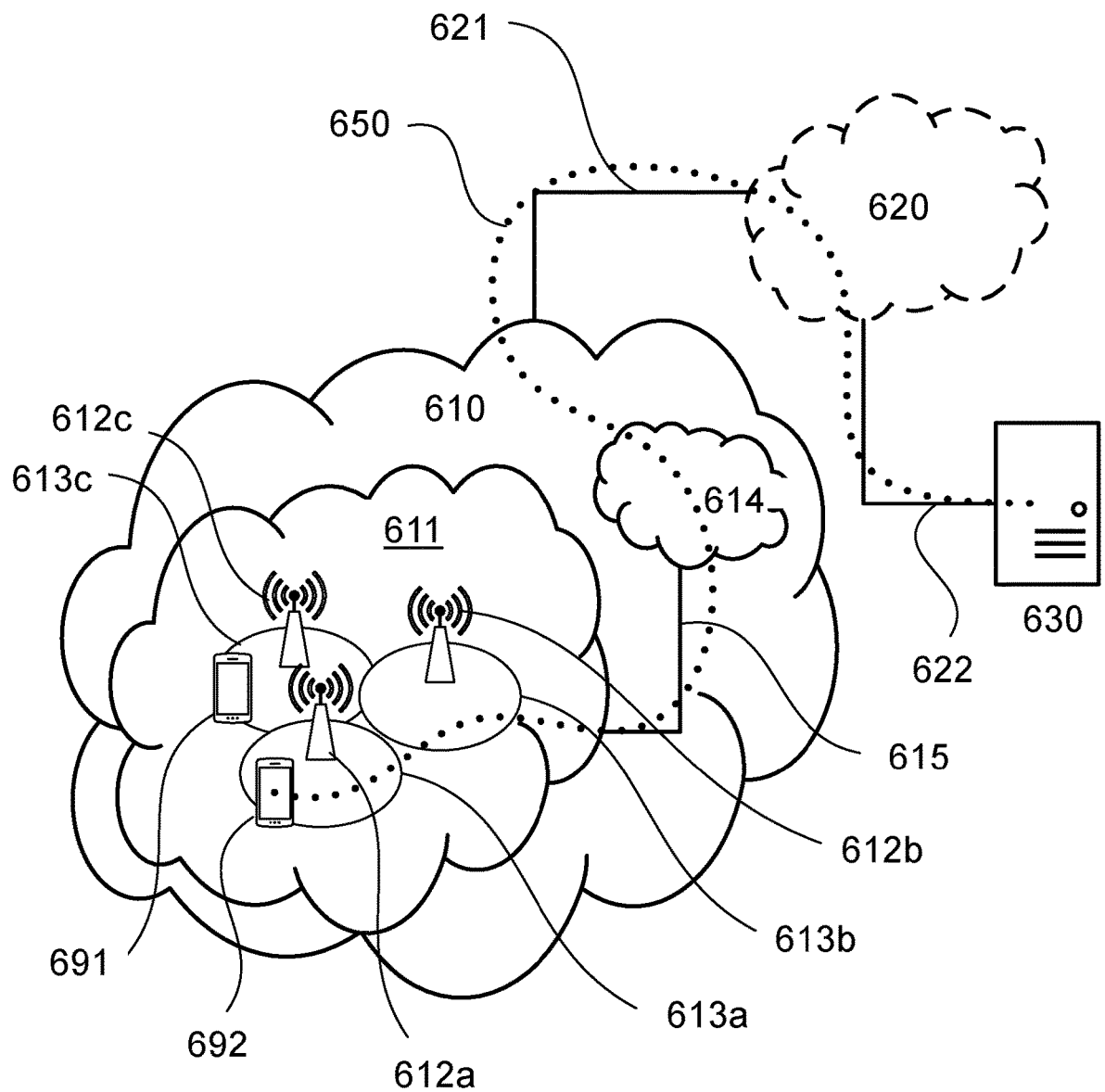
FIG. 19 illustrates a telecommunication network connected via an intermediate network to a host computer, according to certain embodiments.

FIG. 19 illustrates a telecommunication network connected via an intermediate network to a host computer in accordance with some embodiments.

With reference to FIG. 19, in accordance with an embodiment, a communication system includes telecommunication network 610, such as a 3GPP-type cellular network, which comprises access network 611, such as a radio access network, and core network 614. Access network 611 comprises a plurality of base stations 612*a*, 612*b*, 612*c*, such as NBs, eNBs, gNBs or other types of wireless access points, each defining a corresponding coverage area 613*a*, 613*b*, 613*c*. Each base station 612*a*, 612*b*, 612*c* is connectable to core network 614 over a wired or wireless connection 615. A first UE 691 located in coverage area 613*c* is configured to wirelessly connect to, or be paged by, the corresponding base station 612*c*. A second UE 692 in coverage area 613*a* is wirelessly connectable to the corresponding base station 612*a*. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more subnetworks (not shown).

The communication system of FIG. 19 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 20:
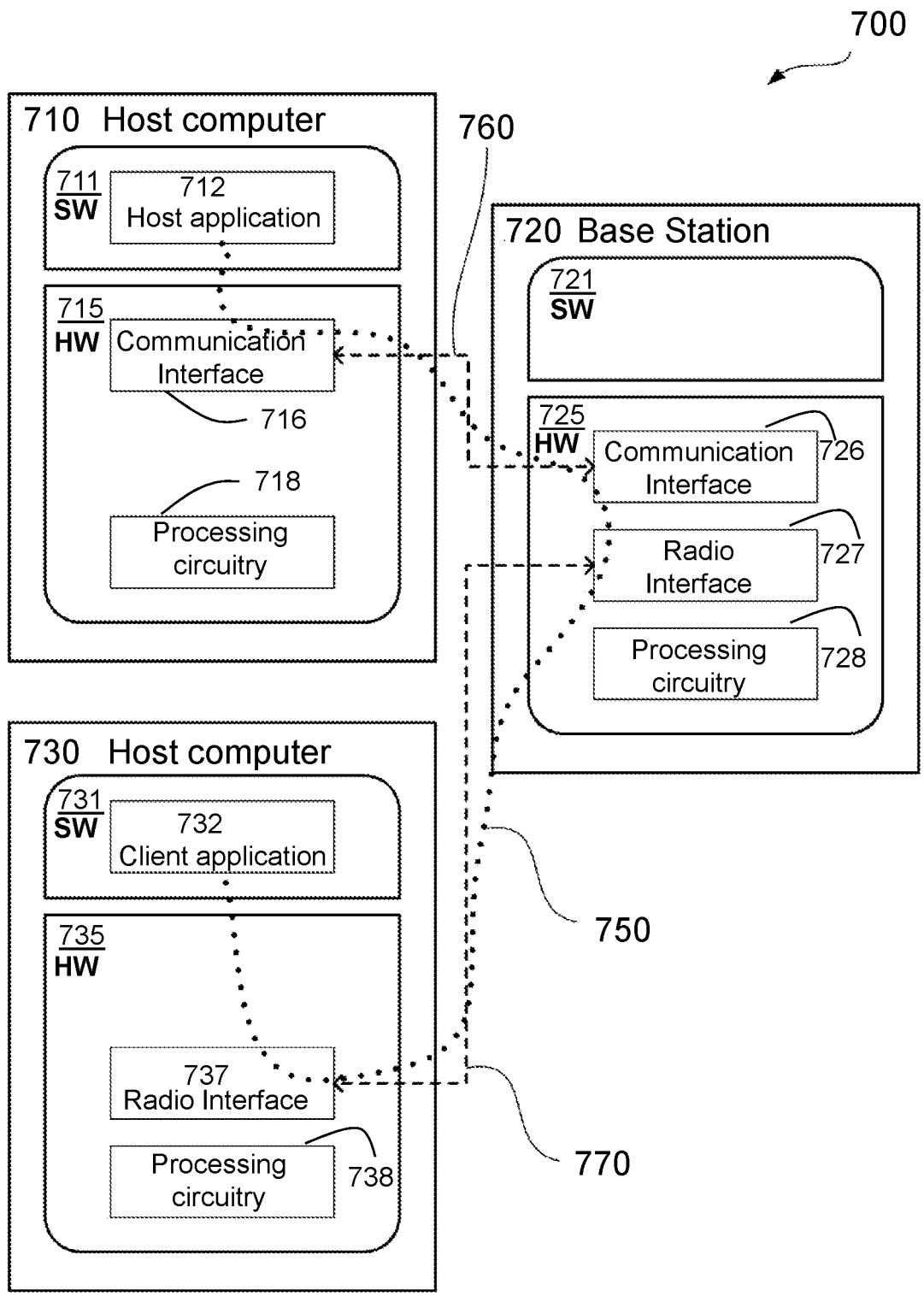
FIG. 20 illustrates a generalized block diagram of a host computer communicating via a base station with a user equipment over a partially wireless connection, according to certain embodiments.

FIG. 20 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 20. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 18) served by base station 720. Communication interface 726 may be configured to facilitate connection 760 to host computer 710. Connection 760 may be direct or it may pass through a core network (not shown in FIG. 18) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 20 may be similar or identical to host computer 630, one of base stations 612a, 612b, 612c and one of UEs 691, 692 of FIG. 19, respectively. This is to say, the inner workings of these entities may be as shown in FIG. 20 and independently, the surrounding network topology may be that of FIG. 19.

In FIG. 20, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment. More precisely, the teachings of these embodiments may improve the data rate, latency, and/or power consumption and thereby provide benefits such as reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figures 21, 22:
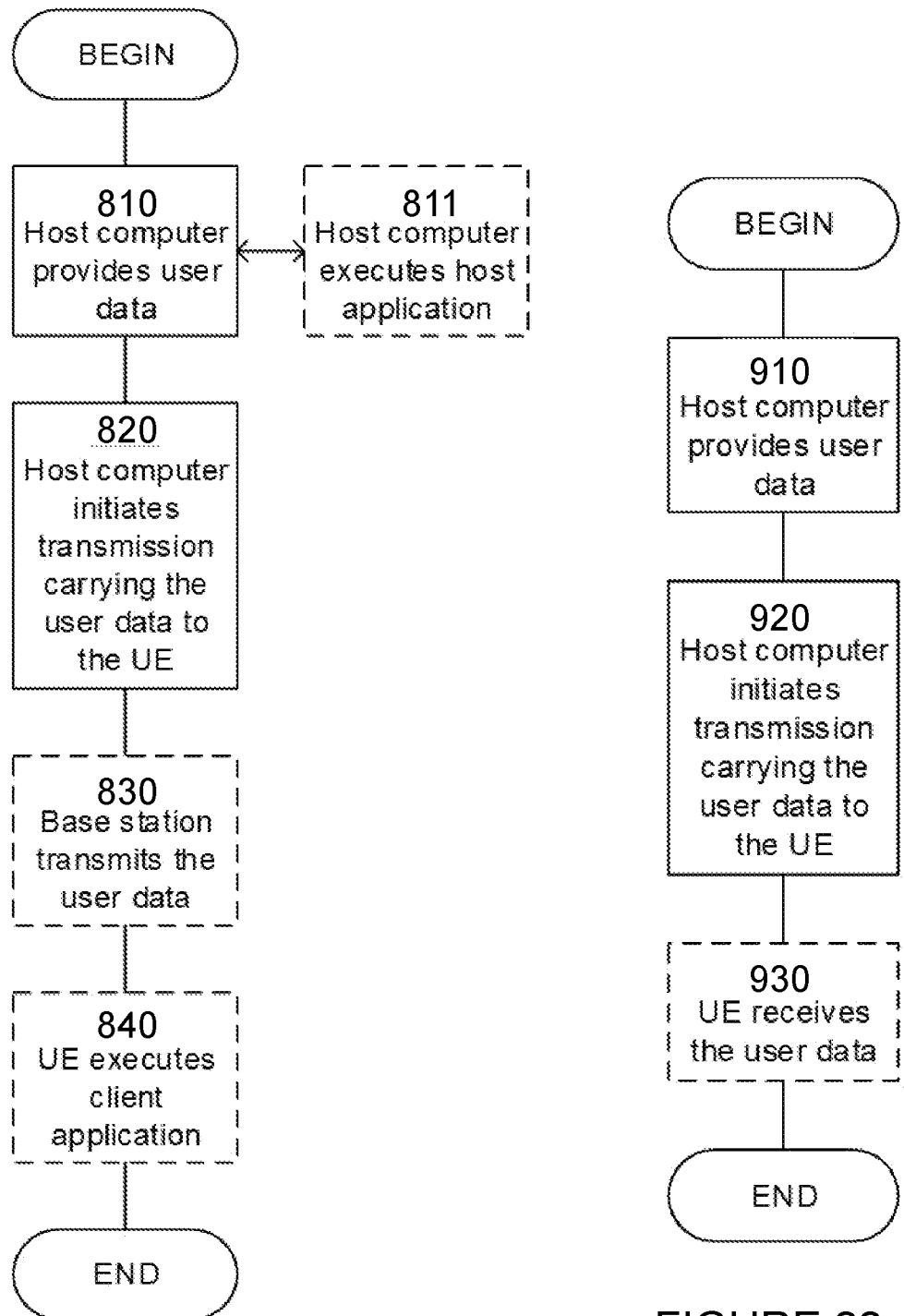
FIG. 21 illustrates a method implemented in a communication system, according to one embodiment.
FIG. 22 illustrates another method implemented in a communication system, according to one embodiment.

FIG. 21 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 21 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

FIG. 22 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 22 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figures 23, 24:
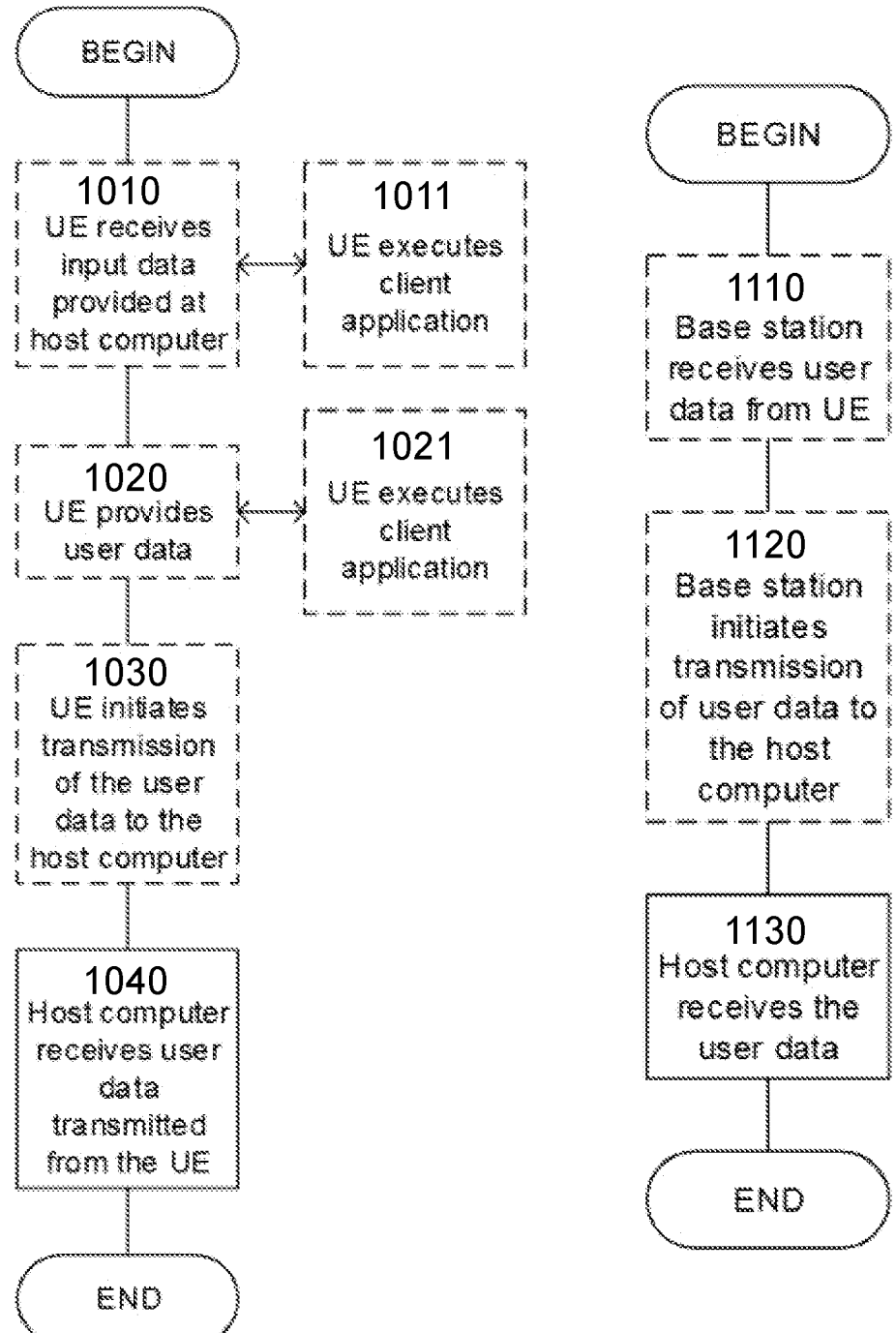
FIG. 23 illustrates another method implemented in a communication system, according to one embodiment.
FIG. 24 illustrates another method implemented in a communication system, according to one embodiment.

FIG. 23 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 23 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in substep 1030 (which may be optional), transmission of the user data to the host computer. In step 1040 of the method, the host computer receives the user data transmitted from the UE, in accordance with the teachings of the embodiments described throughout this disclosure.

FIG. 24 is a flowchart illustrating a method implemented in a communication system, in accordance with one embodiment. The communication system includes a host computer, a base station and a UE which may be those described with reference to FIGS. 19 and 20. For simplicity of the present disclosure, only drawing references to FIG. 24 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Figure 25:
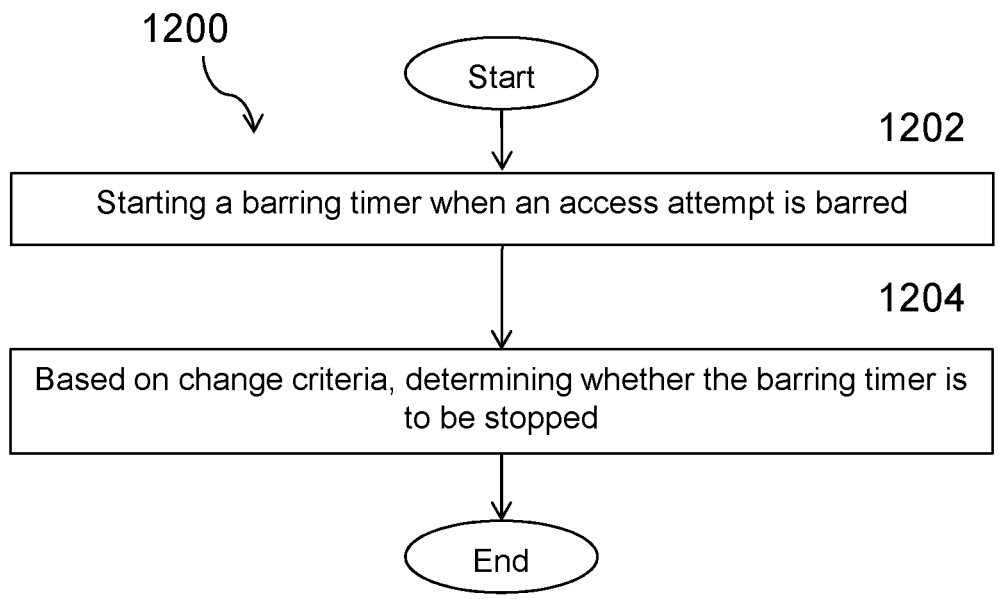
FIG. 25 illustrates an example method by a wireless device for performing access barring, according to certain embodiments.

FIG. 25 depicts a method by a wireless device to perform access barring, according to certain embodiments. At step 1202, the wireless device starts a barring timer when an access attempt is barred. At step 1204, the wireless device determines whether the barring timer is to be stopped based on barring information change criteria.

According to certain embodiments, determining whether the barring timer is to be stopped may include determining that the barring information change criteria is fulfilled. According to various particular embodiments, the barring information change criteria may be fulfilled when the wireless device has been triggered to acquire SIB1 in a currently camped/serving cell, the wireless device performed cell re-selection, the wireless device received a paging message containing system information modification, and/or the wireless device acquired a SIB1 in a currently camped/serving cell.

According to certain embodiments, the determination of whether the barring timer is to be stopped may be based on the barring information change criteria and an access category barring parameter change criteria. For example, in a particular embodiment, an access category barring parameter change criteria may be applied for each access category associated with the barring timer. The access barring information to be used as the UAC parameter if barring check would have been performed using a particular access category may be compared to stored barring information associated with the particular access category. If the access barring information is different than the stored barring information the access category barring parameter change criteria for the particular access category may be determined to be fulfilled.

According to another embodiment, the wireless device may determine that the barring information change criteria is fulfilled by checking an information element in SIB1, comparing the information element in the SIB1 to an information element in a stored SIB1, and determining that the information element in the SIB1 is different from the information element in the stored SIB1.

According to certain embodiments, the wireless device may receive, from a network node, information that indicates a change in a barring factor for an access category associated with the barring timer. The wireless device may determine if the change in the barring factor is less restrictive than a current barring factor by at least a threshold amount and alleviating barring for at least one access category.

According to a particular embodiment, wireless device may perform alleviation of access barring when the barring timer is stopped. In another embodiment, wireless device may determine that the barring timer has expired and perform alleviation of access barring.

According to certain embodiments, wireless device may read new access barring information and discard old access barring information.

According to certain embodiments, the barring information change criteria is defined as the wireless device is triggered to acquire SIB1 in a currently camped/serving cell.

Figure 26:
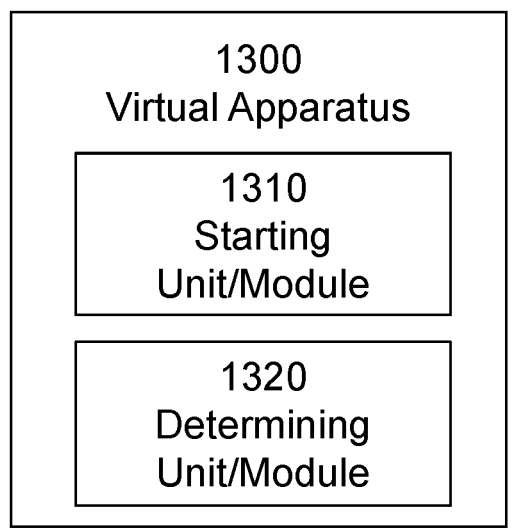
FIG. 26 illustrates an exemplary virtual computing device for performing access barring, according to certain embodiments.

FIG. 26 illustrates a schematic block diagram of a virtual apparatus 1300 in a wireless network (for example, the wireless network shown in FIG. 14). The apparatus may be implemented in a wireless device or network node (e.g., wireless device 310 or network node 360 shown in FIG. 14). Apparatus 1300 is operable to carry out the example method described with reference to FIG. 25 and possibly any other processes or methods disclosed herein. It is also to be understood that the method of FIG. 25 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause starting unit/module 1310, determining unit/module 1320, and any other suitable units or modules of apparatus 1300 to perform corresponding functions according one or more embodiments of the present disclosure.

According to certain embodiments, starting unit/module 1310 may perform certain of the starting functions of the apparatus 1300. For example, starting unit/module 1310 may start a barring timer when an access attempt is barred.

According to certain embodiments, determining unit/module 1320 may perform certain of the determining functions of the apparatus 1300. For example, determining unit/module 1320 may determine whether the barring timer is to be stopped based on barring information change criteria.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Figure 27:
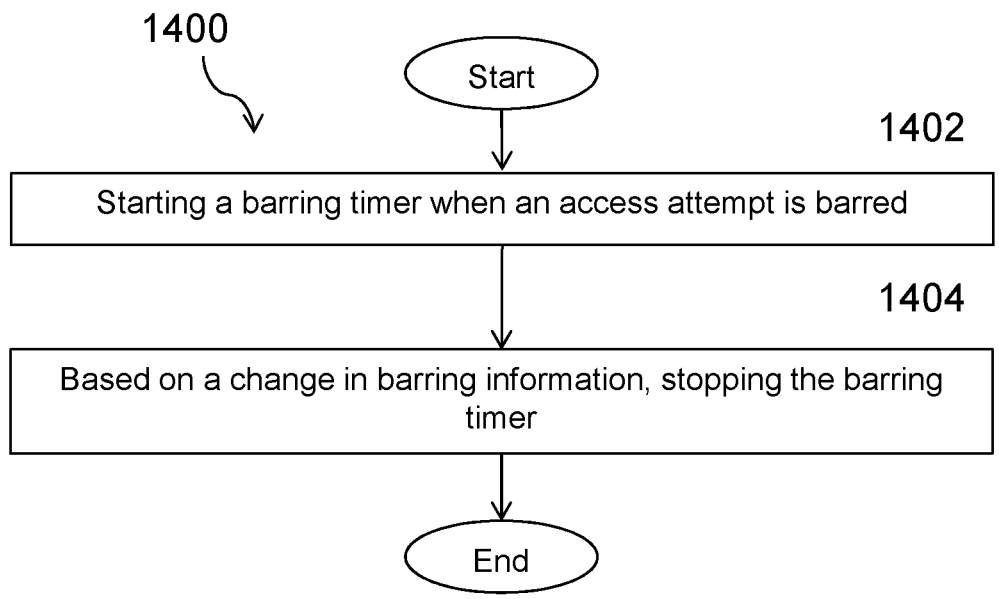
FIG. 27 illustrates another example method by a wireless device for access barring, according to certain embodiments.

FIG. 27 depicts a method by a wireless device to perform access barring, according to certain embodiments. At step 1502, the wireless device starts a barring timer when an access attempt is barred. At step 1504, based on a change in barring information, the wireless device stops the barring timer.

According to certain embodiments, the wireless device performs alleviation of access barring when the barring timer is stopped.

According to certain embodiments, the change in barring information is determined by reading new barring information, determining the new barring information is different from old barring information, discarding the old access barring information.

According to certain embodiments, the change in the barring information is determined in response to a trigger to acquire a SIB.

According to certain embodiments, the change in the barring information is determined by determining an access category barring parameter change criteria. According to a further particular embodiment, determining the access category barring parameter change criteria may include applying an access category barring parameter change criteria for each access category associated with the barring timer, comparing the barring information to be used as a UAC parameter if a barring check would have been performed using a particular access category to stored barring information associated with the particular access category, and determining that the access category barring parameter change criteria for the particular access category is fulfilled when there is a difference between the barring information to be used as the UAC parameter and the stored barring information associated with the particular access category.

According to certain embodiments, in response to stopping the timer, wireless device may perform an access barring check using an access category to determine whether an access attempt is barred. In a further particular embodiment, the barring timer is associated with the access category.

According to certain embodiments, the access attempt is associated with an access category. In a further particular embodiment, the barring timer is associated with the access category.

According to certain embodiments, the change in barring information is determined based on at least one of performing cell re-selection, receiving a paging message containing system information modification; acquiring a SIB1 in a currently camped/serving cell, and performing a handover from a source cell to a target cell.

According to certain embodiments, the change in barring information is determined based on: checking an information element in SIB1, comparing the information element in the SIB1 to an information element in a stored SIB1, and determining that the information element in the SIB1 is different from the information element in the stored SIB1.

According to certain embodiments, the barring information comprises a barring factor and determining the change in barring information may include receiving, from a network node, information that indicates a change in the barring factor for an access category associated with the barring timer, determining if the change in the barring factor is less restrictive than a current barring factor by at least a threshold amount, and alleviating barring for the access category.

Figure 28:
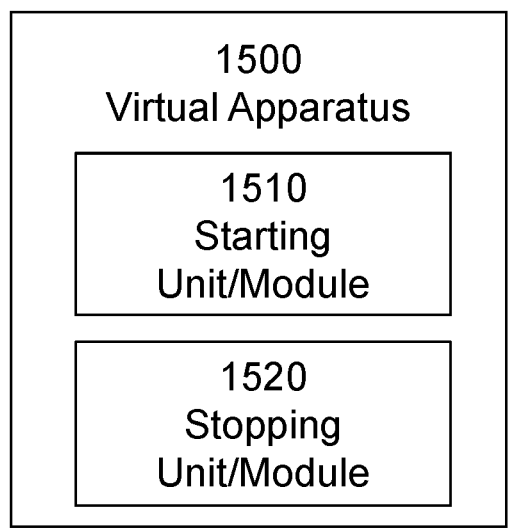
FIG. 28 illustrates another exemplary virtual computing device for access barring, according to certain embodiments.

FIG. 28 illustrates a schematic block diagram of another virtual apparatus 1500 in a wireless network (for example, the wireless network shown in FIG. 14). The apparatus may be implemented in a wireless device or network node (e.g., wireless device 310 or network node 360 shown in FIG. 14). Apparatus 1300 is operable to carry out the example method described with reference to FIG. 27 and possibly any other processes or methods disclosed herein. It is also to be understood that the method of FIG. 27 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause starting unit/module 1510, stopping unit/module 1320, and any other suitable units or modules of apparatus 1500 to perform corresponding functions according one or more embodiments of the present disclosure.

According to certain embodiments, starting unit/module 1510 may perform certain of the starting functions of the apparatus 1500. For example, starting unit/module 1510 may start a barring timer when an access attempt is barred.

According to certain embodiments, stopping unit/module 1520 may perform certain of the stopping functions of the apparatus 1500. For example, stopping unit/module 1520 may stop the barring timer based on barring information change criteria.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Abbreviations

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
5GS 5G System
5QI 5G QoS Identifier
ABS Almost Blank Subframe
AN Access Network
AN Access Node
ARQ Automatic Repeat Request
AS Access Stratum
AWGN Additive White Gaussian Noise
BCCH Broadcast Control Channel
BCH Broadcast Channel
CA Carrier Aggregation
CC Carrier Component
CCCH SDU Common Control Channel SDU
CDMA Code Division Multiplexing Access
CGI Cell Global Identifier
CIR Channel Impulse Response
CN Core Network
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DM Demodulation
DMRS Demodulation Reference Signal
DRX Discontinuous Reception
DTX Discontinuous Transmission
DTCH Dedicated Traffic Channel
DUT Device Under Test
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
EPS Evolved Packet System
E-SMLC evolved Serving Mobile Location Center
E-U IRA Evolved UTRA
E-U IRAN Evolved Universal Terrestrial Radio Access Network
FDD Frequency Division Duplex
FFS For Further Study
GERAN GSM EDGE Radio Access Network
gNB gNode B (a base station in NR; a Node B supporting NR and connectivity to NGC)
GNSS Global Navigation Satellite System
GSM Global System for Mobile communication
HARQ Hybrid Automatic Repeat Request
HO Handover
HSPA High Speed Packet Access
HRPD High Rate Packet Data
LOS Line of Sight
LPP LTE Positioning Protocol
LTE Long-Term Evolution
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MSC Mobile Switching Center
NGC Next Generation Core
NPDCCH Narrowband Physical Downlink Control Channel
NR New Radio
OCNG OFDMA Channel Noise Generator
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PCFICH Physical Control Format Indicator Channel
PDCCH Physical Downlink Control Channel
PDP Profile Delay Profile
PDSCH Physical Downlink Shared Channel
PGW Packet Gateway
PHICH Physical Hybrid-ARQ Indicator Channel
PLMN Public Land Mobile Network
PMI Precoder Matrix Indicator
PRACH Physical Random Access Channel
PRS Positioning Reference Signal
PS Packet Switched
PSS Primary Synchronization Signal
PUCCH Physical Uplink Control Channel
PUSCH Physical Uplink Shared Channel
RACH Random Access Channel QAM Quadrature Amplitude Modulation
RAB Radio Access Bearer
RAN Radio Access Network
RANAP Radio Access Network Application Part
RAT Radio Access Technology
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
RWR Release with Redirect
SCH Synchronization Channel
SCell Secondary Cell
SDU Service Data Unit
SFN System Frame Number
SGW Serving Gateway
SI System Information
SIB System Information Block
SNR Signal to Noise Ratio
S-NSSAI Single Network Slice Selection Assistance Information
SON Self Optimized Network
SS Synchronization Signal
SSS Secondary Synchronization Signal
TDD Time Division Duplex
TDOA Time Difference of Arrival
TOA Time of Arrival
TSS Tertiary Synchronization Signal
TTI Transmission Time Interval
UE User Equipment
UL Uplink
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method by a wireless device to perform access barring, the method comprising:
   starting a barring timer when an access attempt is barred; and
   based on a change in barring information, stopping the barring timer, wherein the change in the barring information is determined by determining that a change in a barring factor included in the barring information is less restrictive than a current barring factor by at least a threshold amount.

2. The method of claim 1, further comprising:
   performing alleviation of access barring when the barring timer is stopped.

3. The method of claim 1, wherein the change in barring information is determined by:
   reading new barring information;
   determining the new barring information is different from old barring information; and
   discarding the old access barring information.

4. The method of claim 1, wherein the change in the barring information is determined in response to a trigger to acquire a system information block (SIB).

5. The method of claim 1, wherein the change in the barring information is determined by determining an access category barring parameter change criteria.

6. The method of claim 5, wherein determining the access category barring parameter change criteria comprises:
   applying an access category barring parameter change criteria for each access category associated with the barring timer;
   comparing the barring information to be used as a Unified Access Control (UAC) parameter when a barring check would have been performed using a particular access category to stored barring information associated with the particular access category; and
   determining that the access category barring parameter change criteria for the particular access category is fulfilled when there is a difference between the barring information to be used as the UAC parameter and the stored barring information associated with the particular access category.

7. The method of claim 1, further comprising in response to stopping the timer, performing an access barring check using an access category to determine whether an access attempt is barred.

8. The method of claim 7, wherein the barring timer is associated with the access category.

9. The method of claim 1, wherein the access attempt is associated with an access category.

10. The method of claim 9, wherein the barring timer is associated with the access category.

11. The method of claim 1, wherein the change in barring information is determined based on at least one of:
    performing cell re-selection;
    receiving a paging message containing system information modification;
    acquiring a system information block (SIB1) in a currently camped/serving cell; and
    performing a handover from a source cell to a target cell.

12. The method of claim 1, wherein the change in barring information is determined based on:
    checking an information element in SIB1;
    comparing the information element in the SIB1 to an information element in a stored SIB1; and
    determining that the information element in the SIB1 is different from the information element in the stored SIB1.

13. A non-transitory computer readable medium storing instructions which when executed by a computer perform the method of claim 1.

14. A wireless device comprising:
    memory operable to store instructions; and
    processing circuitry operable to execute the instructions to cause the wireless device to:
       start a barring timer when an access attempt is barred; and
       based on a change in barring information, stopping the barring timer,
    wherein the change in the barring information is determined by determining that a change in a barring factor included in the barring information is less restrictive than a current barring factor by at least a threshold amount.

15. The wireless device of claim 14, wherein the processing circuitry is operable to execute the instructions to cause the wireless device to:

perform alleviation of access barring when the barring timer is stopped.

16. The wireless device of claim 14, wherein when determining the change in barring information the processing circuitry is operable to execute the instructions to cause the wireless device to:
read new barring information;
determine the new barring information is different from old barring information; and
discard the old access barring information.

17. The wireless device of claim 14, wherein the change in the barring information is determined in response to a trigger to acquire a system information block (SIB1).

18. The wireless device of claim 15, wherein when determining the change in the barring information the processing circuitry is operable to execute the instructions to cause the wireless device to determine an access category barring parameter change criteria.

19. The wireless device of claim 18, wherein when determining the access category barring parameter change criteria the processing circuitry is operable to execute the instructions to cause the wireless device to:
apply an access category barring parameter change criteria for each access category associated with the barring timer;
compare the barring information to be used as a Unified Access Control (UAC) parameter when a barring check would have been performed using a particular access category to stored barring information associated with the particular access category; and
determine that the access category barring parameter change criteria for the particular access category is fulfilled when there is a difference between the barring information to be used as the UAC parameter and the stored barring information associated with the particular access category.

20. The wireless device of claim 14, wherein the processing circuitry is operable to execute the instructions to cause the wireless device to:
in response to stopping the timer, perform an access barring check using an access category to determine whether an access attempt is barred.

21. The wireless device of claim 20, wherein the barring timer is associated with the access category.

22. The wireless device of claim 14, wherein the access attempt is associated with an access category.

23. The wireless device of claim 22, wherein the barring timer is associated with the access category.

24. The wireless device of claim 14, wherein the change in barring information is determined based on at least one of:
performing cell re-selection;
receiving a paging message containing system information modification;
acquiring a system information block (SIB1) in a currently camped/serving cell; and
performing a handover from a source cell to a target cell.

25. The wireless device of claim 14, wherein the change in barring information is determined based on:
checking an information element in SIB1;
comparing the information element in the SIB1 to an information element in a stored SIB1; and
determining that the information element in the SIB1 is different from the information element in the stored SIB1.

26. The wireless device of claim 14, wherein when determining the change in barring information the processing circuitry is operable to execute the instructions to cause the wireless device to:
receive, from a network node, information that indicates the change in the barring factor for an access category associated with the barring timer;
determine that the change in the barring factor is less restrictive than the current barring factor by at least the threshold amount; and
alleviate barring for the access category.

* * * * *